(12) United States Patent
Van Cor

(10) Patent No.: US 6,499,373 B2
(45) Date of Patent: Dec. 31, 2002

(54) STACK OF GEARS AND TRANSMISSION SYSTEM UTILIZING THE SAME

(76) Inventor: Dale E. Van Cor, 201 S. Parrish Rd., Winchester, NH (US) 03470

( * ) Notice: Subject to any disclaimer, the term of this patent is extended or adjusted under 35 U.S.C. 154(b) by 0 days.

(21) Appl. No.: 09/891,226

(22) Filed: Jun. 25, 2001

(65) Prior Publication Data

US 2002/0043120 A1 Apr. 18, 2002

Related U.S. Application Data

(63) Continuation-in-part of application No. 09/734,407, filed on Dec. 11, 2000.
(60) Provisional application No. 60/172,522, filed on Dec. 17, 1999.

(51) Int. Cl.$^7$ .................................................. F16H 3/22
(52) U.S. Cl. ......................................................... 74/349
(58) Field of Search ............................ 74/341, 348, 349

(56) References Cited

U.S. PATENT DOCUMENTS

| | | | | | |
|---|---|---|---|---|---|
| 1,159,463 | A | * | 11/1915 | Barr et al. | |
| 1,484,197 | A | * | 2/1924 | Stefani | |
| 2,208,148 | A | * | 7/1940 | Shafer | |
| 2,234,653 | A | * | 3/1941 | Rothfield | |
| 2,697,365 | A | * | 12/1954 | Williams | |
| 2,875,628 | A | * | 3/1959 | Walter | |
| 2,926,538 | A | * | 3/1960 | Schafer | |
| 3,381,544 | A | * | 5/1968 | Butler | |
| 4,630,495 | A | * | 12/1986 | Smith | 74/191 |
| 5,425,685 | A | * | 6/1995 | Park | 476/55 |
| 5,545,101 | A | * | 8/1996 | Kawase et al. | 475/193 |
| 5,601,509 | A | * | 2/1997 | Munoz | 476/53 |

* cited by examiner

Primary Examiner—Dirk Wright
(74) Attorney, Agent, or Firm—Michael J. Persson; Lawson. Philpot & Persson, P.C.

(57) ABSTRACT

A stack of gears including and a first and a second gear disposed in parallel relation to, and sharing a common axis with, the first gear. Each gear is of a different diameter and each includes a plurality of teeth. At least one transition train is teeth disposed between the first gear and the second gear. Like the first and second gear, the transition train also includes a plurality of teeth that are disposed in substantially perpendicular relation to the common axis. The transition train is dimensioned to form at least one deceleration channel and at least one acceleration channel extending from each of the first gear and the second gear. The stack of gears may be dimensioned for use with a pinion gear, or with a continuous loop drive, such as a chain or belt.

39 Claims, 28 Drawing Sheets

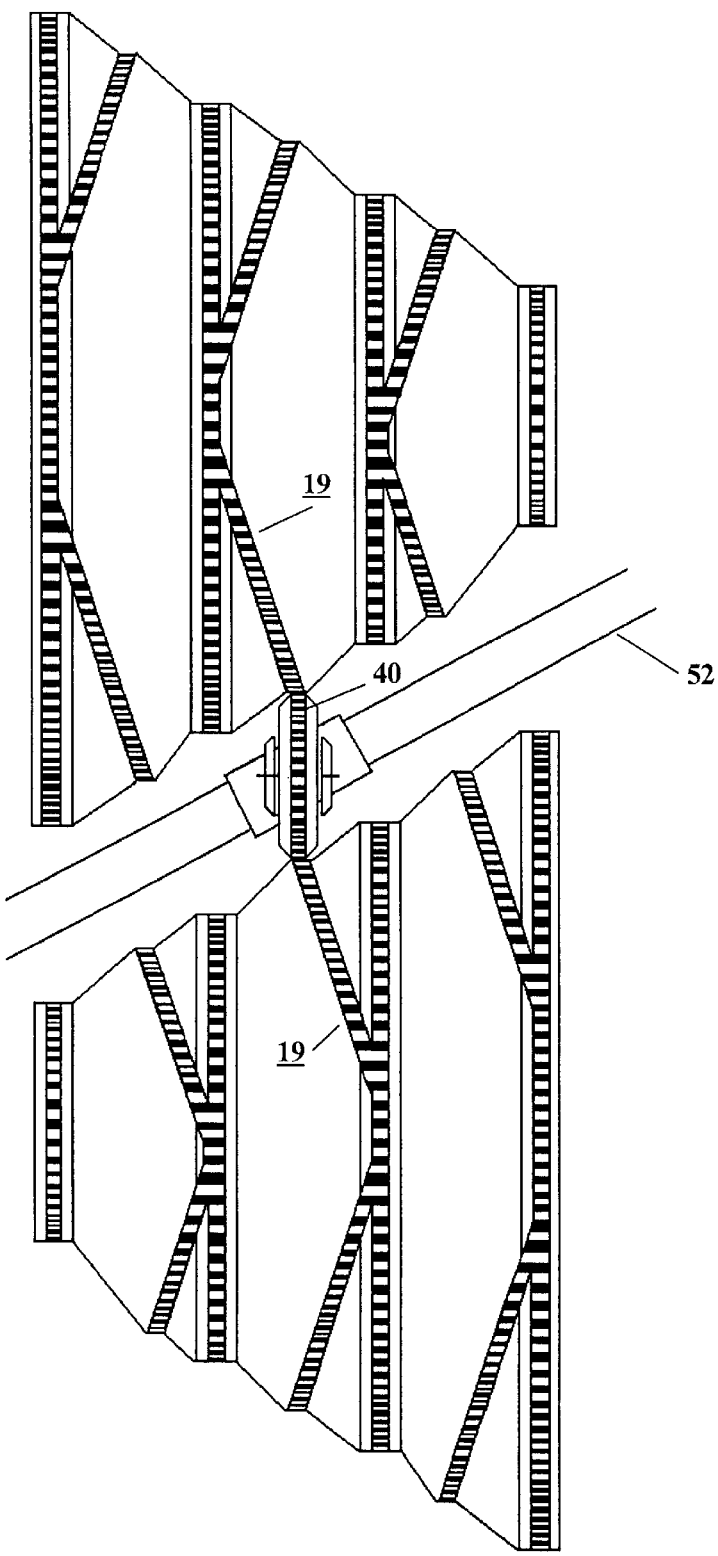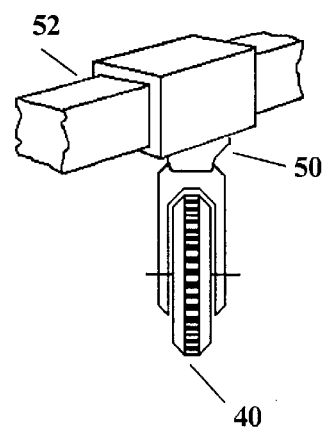
Fig. 5A
Fig. 5B

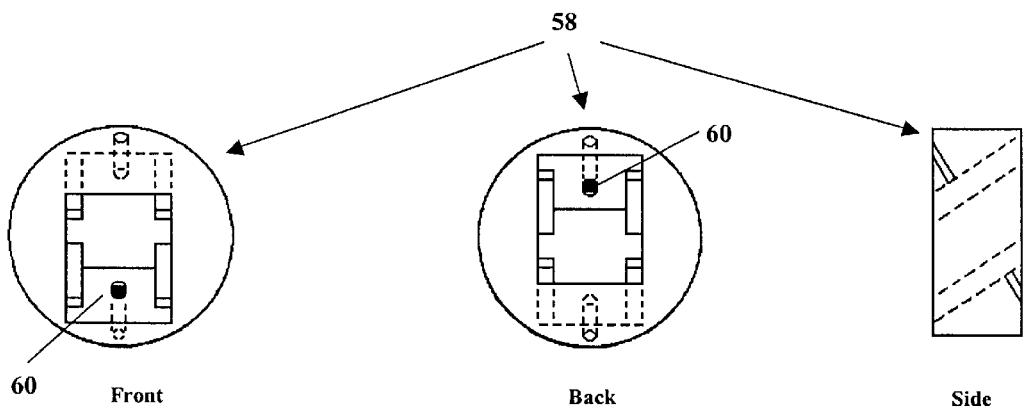
Fig. 6C
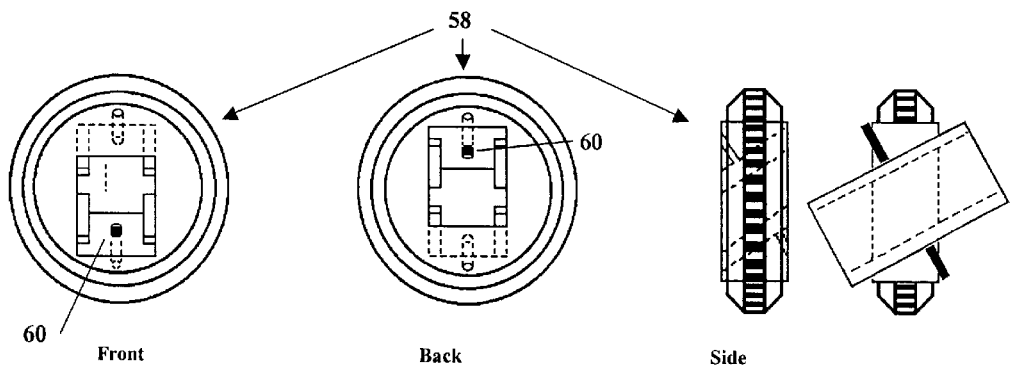
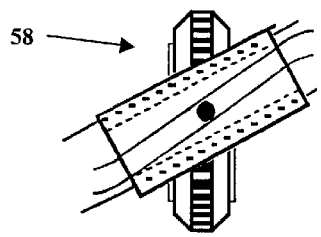
Fig. 6D

STACK OF GEARS AND TRANSMISSION SYSTEM UTILIZING THE SAME

CLAIM OF PRIORITY

This patent application is a Continuation-In-Part of pending U.S. Pat. application No. 09/734,407, filed on Dec. 11, 2000, which claims the benefit of U.S. Provisional Application No. 60 /172,522, filed on Dec. 17, 1999.

BACKGROUND OF THE INVENTION

Transmission devices are gear trains that convert and transmit the power generated by a power source to comply with the load placed on the output shaft. Many prior art transmission devices, such as those commonly utilized in automobiles, require manual shifting among various gear ratios of the transmission. However, such transmissions are inherently inefficient due both to the loss of momentum caused by the removal of the power in order to change gears, and the inherent difficulty in determining the most efficient response to a load placed upon the output shaft.

A vast array of automatic transmissions are currently available. These transmissions do not require a manual determination of the most efficient response to a load placed upon the output shaft. In addition, they will typically reduce the time required to shift gears and, consequently, reduce the loss of momentum caused by the removal of power. Nonetheless, this loss of momentum, which is inherent in traditional automatic transmissions utilizing a variety of gear ratios, still results in a significant loss of power. In addition, the limited number of gear ratios available prevents these transmissions from achieving maximum efficiency.

In order to avoid momentum losses and attain maximum efficiency, it is desirable for a transmission to have a continuous, infinite range of gear ratios. Such a transmission would not require power to be removed in order to change gears and would be capable of efficiently responding to the various loads placed on the output shaft.

A number of United States Patents disclose continuous, or near-continuous, variable speed transmission. However, each has significant drawbacks. For example, U.S. Pat. No. 1,484,197 discloses a "change-speed transmission" that includes two conical wheels having teeth of uniform pitch throughout extending along the length of the cone and covering substantially one half of each conical surface. The cones are arranged to mesh with an intermediate wheel and are simultaneously rotated so that the teeth of one conical wheel move out of mesh with the intermediate wheel as the teeth of the other conical wheel move into mesh with the intermediate wheel. The gear ratio is varied by varying the position of the intermediate wheel relatively to the large and small diameters of the conical wheels.

This arrangement is successful at varying the gear ratio without loss of momentum. However, such a system creates inherently high shear stresses that severely limit its useful life. These shear stresses are explained by the fact that the circumference of the cylinder at its front and rear edges is the same, but these circumferences are forced to frictionally and rotatably engage with different-sized circumferences on the conical surface. As the wider portions of the conical surface travel faster than the narrower portions, the equal circumference of the cylinder respectively engages different-sized circumferences on the conical surface necessarily traveling at different speeds. This causes some portions of the cylinder to slip and rub against the faster conical portions resulting in shear forces.

U.S. Pat. Nos. 2,208,148 and 2,926,538 each describe a "change speed gear" having a plurality of stepped gears arranged side by side on a cone drum and a cylindrical control gear displaceable disposed along a line of the surface of the cone of stepped gears on the driving shaft. Each stepped gear is diametrically subdivided and the two halves of the toothed rim of each step are displaced relative to each other. The spaces between steps are subdivided and staggered and the widths of the spaces is equal to half the width of the teeth of the control gear. The difference in the number of teeth from step to step is divided by two such that the opposite spaces between the points of bisection of the displaced rim halves of all steps are aligned. In operation, the control gear is caused to change its position relative to the cone drum in a synchronized manner such that it moves from one gear to the next in a stepped motion.

As this system utilizes the same cylindrical type control gear as described above, it suffers that same shear stress problems. In addition, the averaged tooth arrangement disclosed in these patents creates both wear and shock on the gears when changing from one set of teeth to another. For this reason, it is useful only at very low speeds.

U.S. Pat. No. 2,234,653 describes a variable transmission having two shafts around which series of teeth are wound. Each series of teeth forms a helix of decreasing diameter, with the teeth of one shaft being aligned with a space between teeth on the other. A spur gear is mounted between the shafts and is dimensioned to engage teeth on both shafts. The movement of the spur gear upward or downward causes it to engage teeth on both shafts, then teeth on only one shaft, and then teeth on both shafts again, with each movement causing an instantaneous change in the gear ratio.

This system does not require power to be removed from the transmission and provides the desired variability. However, the cylindrical nature of the spur gear of the compensation member causes it to suffer from the same shear stress problems described above. In addition, the use of substantially straight teeth causes discontinuous contact between teeth resulting in rapid increases and decreases in stress during gear changes.

U.S. Pat. No. 2,697,365, titled "Power Transmission Equipment", describes "a mechanism for producing positive infinitely variable speed changes in a power transmission system." The mechanism includes "at least two conical gear members having uniformly spaced teeth generated in a constant lead spiral path on the conical surface of each of said conical gear members." A compensation member, in the form of a spur gear, is interposed between, and engaged with, the conical members such that the axial position of the compensation member with respect to conical gear members determines the speed ratio obtained between the input and output members. In order to vary the speed ratio, the compensation member is disengaged from the conical members.

This system provides the desired variability. However, the cylindrical nature of the spur gear of the compensation member causes it to suffer from the same shear stress problems described above. In addition, the narrow tooth width required by this transmission decreases the overall strength of the teeth.

U.S. Pat. No. 2,875,628 describes a variable speed transmission that utilizes conical gears mounted in opposite relation to each other and each having sets of rigidly attached gear segments bounded by sets that are frictionally engaged with the rigidly attached segments. A spur gear is mounted between, and engaged with, the conical gears. The spur gear is adjustable upward and downward between the conical gears and shift gear ratios by moving from engagement with a rigidly attached gear segment to a frictionally engaged gear segment and then to the next rigidly attached gear segment.

This system is substantially continuous and provides an increased degree of variability. However, the cylindrical nature of the spur gear causes it to suffer from the same shear stress problems described above. Further, the lack of alignment between slopping and non-slipping teeth creates high stresses when going from a slipping portion to an adjacent non-slipping portion.

More recently, U.S. Pat. No. 5,407,399 describes a "variable speed friction transmission" as a variable ratio friction transmission in which a straight sided cone and a roller are in frictional engagement. The roller moves over an element of the cone to change the speed ratio, and at all times stays parallel to itself and moves along a straight line axis. This axis passes through the apex of the cone at all times, but the cone is tilted about its apex to contact the roller or wheel as the ratio is changed.

This system is substantially continuous and provides an increased degree of variability. In addition, the frictional engagement of the wheel with the cone eliminates the stress problems encountered with the meshing of spur gears with conical surfaces. However, the frictional engagement of this system severely limits it ability to operate under heavy loads. Further, frictional engagement is prone to wear and, consequently, the frictional surfaces on such a system would need to be replaced regularly.

U.S. Pat. No. 5,425,685 describes a "continuously variable-ratio transmission". This transmission includes a drive shaft having a series of curved teeth that are disposed in the same direction of the shaft and of such a shape that one end has a relatively small diameter and the other a relatively large diameter. A conical gear is engaged with the teeth and is flexibly attached to a splined shaft via a second gear and a universal joint. The splined shaft is attached to a second universal joint to allow it to maintain a constant angle relative to the surface of the shaft, allowing the conical gear to conform to the angle of the surface of the teeth formed on the shaft. In operation, the speed is changed by moving the conical gear up and back along the surface of the drive shaft.

This system is also substantially continuous and provides an increased degree of variability. However, it also relies upon frictional engagement, severely limiting its ability to operate under heavy loads and making it prone to wear.

U.S. Pat. No. 5,545,101 describes a "friction type continuously variable transmission" in which a planetary gear unit is attached to a frictionally engaged continuously variable unit. The planetary gear unit has a drive shaft, a carrier fixed to the drive shaft, a plurality of planetary gears supported on the carrier, and an internal gear meshing with the planetary gears. The continuously variable transmission unit has an input shaft to which is fixed to a sun gear meshing with the planetary gear.

This system is substantially continuous and provides an increased degree of variability. In addition, the frictional engagement of the wheel with the cone eliminates the stress problems encountered with the meshing of spur gears with conical surfaces. Finally, the integration of the planetary system allows the impeller to be rotated at a high speed even if the speed ratio of the continuously variable transmission unit is low. However, it is not without its drawbacks. As with all frictional systems, the frictional engagement of this system severely limits it ability to operate under heavy loads. Further, frictional engagement is prone to wear and, consequently, the frictional surfaces on such a system would need to be replaced regularly.

U.S. Pat. No. 5,601,509 describes a "taper roller continuously variable transmission" that includes a set of power input cones tapered in a first direction and a set of power output cones tapered in a opposite direction. Each cone has an axis of rotation oriented such that a portion of a surface parallel to a portion of the surface of each of the other cones in the same set. A power transfer ring tractionally engages the sets of cones on the parallel portions to transfer power from the input to the output set of cones. The power transfer ring is movable axially along the parallel portions to vary the speed ratio from the power input cones to the power output cones.

This system is also substantially continuous and provides an increased degree of variability. However, it again relies upon frictional engagement, severely limiting its ability to operate under heavy loads and making it prone to wear.

SUMMARY OF THE INVENTION

The present invention is a stack of gears, and transmission system utilizing the same, that overcomes the drawbacks of the prior art. In its most basic form, the stack of gears includes and a second gear disposed in parallel relation to, and sharing a common axis with, the first gear. Each gear is of a different diameter and each includes a plurality of teeth. At least one transition train is teeth disposed between the first gear and the second gear. Like the first and second gear, the transition train also includes a plurality of teeth that are disposed in substantially perpendicular relation to the common axis. The transition train is dimensioned to form at least one deceleration channel and at least one acceleration channel extending from each of the first gear and the second gear.

In some embodiments, the teeth of the stack of gears are dimensioned to mate with a pinion gear having an axis that is substantially parallel to the common axis of the first gear and the second gear. In some such embodiments a space between each of the third plurality of teeth of the transition train is substantially equal. In others, the teeth of the transition train forms an S-curve between the first gear and the second gear. Likewise, in others, the third plurality of teeth comprise teeth have a width equal to that of the teeth of the first gear and the second gear. In most embodiments, teeth may be straight teeth or helical teeth.

In some embodiments of the invention the stack of gears is dimensioned such that the acceleration channels and deceleration channels wrap around the stack several times by sharing teeth in the crossing channels. This differs from the VCT in that the VCT has to convert from a channel to a segment of a nascention circle, where the paths can cross, and then back to a channel.

It is preferred that the stack of gears also be able to be integrated into a control system used in connection with the transmission systems of the invention. In some such embodiments, the stack of gears includes at least a first conic surface disposed between the first gear and the transition train and a the second conic surface disposed between the transition train and the second gear. These conic surfaces preferably have a conic angle dimensioned to mate with a bumper of the pinion gear.

In some embodiments of the invention the stack of gears is dimensioned to mate with a continuous loop drive, such as a chain, a toothed belt, a V-belt, or a flat belt drive. In some such embodiments, the transition train of gears is angled to accept a twisted continuous loop drive. In others, two transition trains that cross each other over an intersection having substantially no teeth.

The basic embodiment of the transmission system includes the basic embodiment of the stack of gears, described above, and a mating member dimensioned to mate with the first plurality of teeth, the second plurality of teeth, and the third plurality of teeth of the stack of gears. As noted above, in some embodiments, this mating member is a pinion gear, while in others it is a continuous loop drive, such as a chain, a toothed belt, a V-belt, or a flat belt drive.

The preferred transmission system includes a control system for controlling the position of the mating member. In some embodiments utilizing a pinion gear, the control system includes at least a first conic surface and a second conic surface disposed upon the stack of such that the first conic surface is disposed between the first gear and the transition train and wherein the second conic surface is disposed between the transition train and the second gear. A pair of bumpers is disposed at an angle upon the pinion gear dimensioned to mate with a conic angle of the first and second conic surfaces. In some embodiments, the control system also includes a rail and a rocker arm slidably attached to the rail. The pinion gear is rotatably attached to the rocker arm and the rail is disposed in relation to the stack of gears such that the pinion gear is in contact with one of the first plurality of teeth, the second plurality of teeth, and the third plurality of teeth.

In some embodiments, the control system includes a resistance control for controlling a movement of the pinion gear. In one such embodiment, the control system includes a rail into which a track is disposed a shuttle slidably attached to the rail. The shuttle includes a bearing block disposed within and a pin that extends from the bearing block and fits within the track of the rail. The pinion gear is rotatably attached to the bearing block of the shuttle and the rail is disposed in relation to the stack of gears such that the pinion gear is in contact with one of the first plurality of teeth, the second plurality of teeth, and the third plurality of teeth. The subsequent movement of the gear is controlled by the resistance produced by the movement of the pin within the track.

The invention claimed herein has a number of similarities to, and a number of key differences from, the invention described and claimed in the inventor's pending U.S. Pat. application Ser. No. 09/734,407, hereafter referred to as the "VCT", of which this application is a continuation-in-part and, consequently, is herein incorporated by reference in its entirety.

As described in detail below, the present invention, hereafter referred to as the "VCT2", is fundamentally different from the VCT in seven distinct ways. First, the axis of the pinion gear in the VCT2 is parallel with the axis of the cone, where the VCT had the gear axis parallel to the face of the cone. Second, the conix formula does not apply as the pinion gear can be a standard gear or any helical gear. Third, the VCT cone does not have to be a cone in the VCT2, as the angle between the ring gears can be constant, varied or curved. Fourth, the embodiment of the VCT described in FIG. 62 of the parent application will not work with the VCT2, as the shaft the pinion gear is on is for controlling the position of the gear. Fifth, the VCT Felch cascade configuration will not work with the VCT2 because the cone cannot move independently and lateral movement of the inner and outer shaft would be unworkable. Sixth, the Persson configuration of the VCT2, described below, will not work with the VCT because the axes of all gears are parallel to each other. Seventh, as noted above, the channels of the VCT2 may cross by sharing teeth, while the channels in the VCT have to convert to a nascention ring segment where they cross and then start back into another channel.

The VCT2 is also similar to the VCT in many ways. For example, vector loading of the VCT applies directly to embodiments of the VCT2 where the first and second gears are helical gears, as these can still experience sideways pressure to move to a higher or lower gear range due to the vectoral force applied to the helical surface. In such an embodiment, the stack of gears of the VCT2 may have different helical teeth based on the environment. For example, a high torque environment would require a smaller helical angle then the lower torque, so that it did not move to easily.

Another similarity is in the designs of the acceleration and deceleration channels as the lateral motion in each should be an S-curve. Further, as with many embodiments of the VCT, embodiments of the VCT2 have an entrance, acceleration and deceleration tube and an exit. The speed in the entrance is the speed of the departing ring gear and the speed of the exit is the speed of the arriving ring gear. The tube is where the speed changes on a fractional basis making the change in speed continuous as opposed to stepped.

Yet another similarity is that both follow the same footprint analysis when laying out the movement of pinion gear through the channels is very similar, with both the VCT and VCT2 being adaptable for use with a variety of alignment and control surfaces.

Finally, as was the case with the VCT, the VCT2 may be utilized in a number of configurations. These may be grouped as cascading, planetary or differential.

Therefore, it is an aspect of the invention to provide a transmission that avoids momentum losses by not requiring power to be removed in order to change speed.

It is an aspect of the invention to provide a transmission that has an infinite range of gear ratios.

It is an aspect of the invention to provide a transmission that is capable of efficiently responding to the various loads placed on the output shaft.

It is an aspect of the invention to provide a transmission that avoids the shear stress problem attendant to the use of cylindrical spur gears in contact with conical gears.

It is an aspect of the invention to provide a transmission in which the arrangement of rings prevents excessive sliding within the gears.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 5A is a is a side view of one embodiment of a transmission apparatus of the present invention having two stacks of gears and a pinion gear disposed therebetween and mounted to a rail via a rocker arm.

FIG. 5B is an exploded isometric view of the pinion gear, rocker arm and rail of FIG. 5A.

FIG. 6C is a cut away side view of a bearing block and pin mounted within the shuttle of FIG. 6A.

FIG. 6D is a cut away side view of a cut away view of the bearing block and pin of FIG. 6A showing the mounting of the gear and the orientation of the block to the rail.

DETAILLED DESCRIPTION OF THE INVENTION

Figure 1:
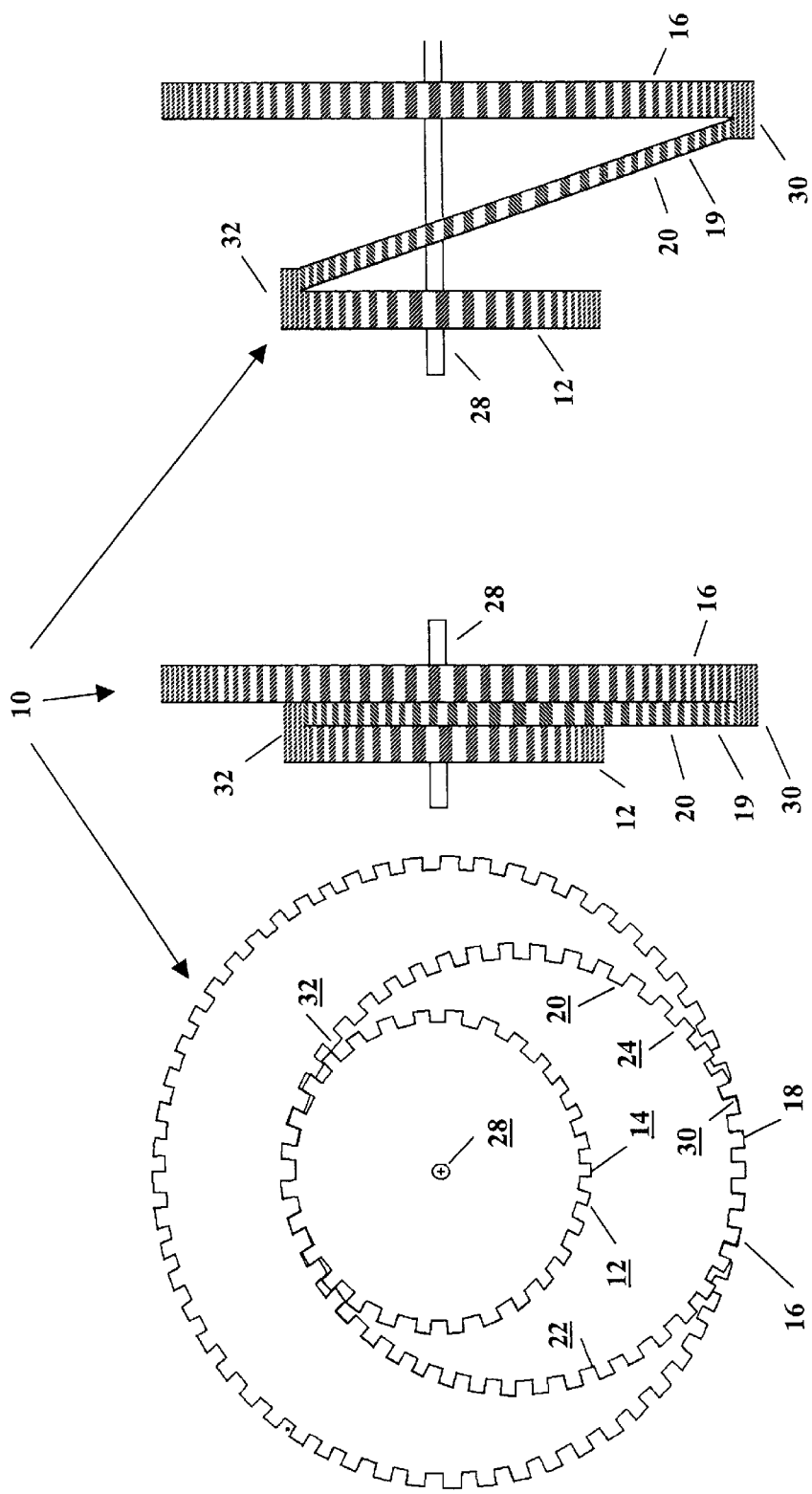
FIG. 1A is a top view of one embodiment of the stack of gears of the present invention.
FIG. 1B is a side view of the embodiment of the stack of gears of FIG. 1 having a small lateral displacement between gears.
FIG. 1C is a side view of the embodiment of the stack of gears of FIG. 1 having a large lateral displacement between gears.

The VCT2 includes a stack of gears 10 with at least one acceleration channel and one deceleration channel between each gear in the stack of gears 10. Referring first to FIGS. 1A–1C, one embodiment of the VCT2 is shown. FIG. 1A shows a first gear 12 having a first plurality of teeth 14, a larger second gear 16 having a second plurality of teeth 18 and a common axis 28 with the first gear 12, and an transition train 19 having a third plurality of teeth 24. Each plurality of teeth 14, 18, 24 is disposed in substantially perpendicular relation from the common axis 28 shared by the first gear 12 and the second gear 16. This allows standard, "off the shelf" gears to be utilized in the stack of gears 10 of the VCT2.

The transition train 19 is made up of the an acceleration channel 20 and a deceleration channel 22, which are disposed between, and connect, the first plurality of teeth 14 of the first gear 12 and the second plurality of teeth 18 of the second gear 16. The acceleration channel 20 and deceleration channel 22 of the VCT2 is similar to those used with the VCT and perform the same function of providing a path between rings or gears. As was the case with the VCT, the channels 20, 22 may take many forms, but here may also include variations to accept continuous loop drives, such as those described below.

As shown in FIG. 1B, the transition train 19 may be substantially flat and stacked between the first gear 12 and the second gear 14. However, as shown in FIG. 1C, the transition train 19 may be angled between the gears 12, 16 and act as a means for allowing a larger lateral movement between the gears 12, 16. The transition train 19 has evenly spaced teeth, so that it will properly engage the teeth of a mating gear or continuous loop drive (not shown). By engaging such a mating gear or loop drive, transition train 19 allows the mating gear or loop drive to move between the smaller diameter first gear 12 and the larger diameter second gear, causing the mating gear or loop drive to accelerate and decelerate fractionally with every fractional movement. In this manner, part of the transition train 20 functions as an acceleration tube, and part of the transition train 22 functions as a deceleration tube.

As shown in FIGS. 1B and 1C, the acceleration channel 20 and the first plurality of teeth 14 form an acceleration exit 30 between the channel 20 and the first gear 12 and the acceleration channel 20 and the second plurality of teeth 18 form an acceleration entrance 32 between the channel 20 and the second gear 16. Likewise, the deceleration channel 22 forms an entrance and exit (not shown) that are used during deceleration.

In some embodiments, such as the embodiment of FIG. 1A, this transition train 19 is substantially elliptical shaped. However, the shape of the transition train 19 may be varied in order to provide a smooth transition between the gears 12, 16. The shape of the transition train 19 determines the change in the speed. It does so by changing the diameter of the stack of gears 10. As a pinion gear moves along the path, the radius to the common axis is changed until it reaches the next larger or smaller gear. This radius determines surface speed, so each change in diameter is a change in the surface speed. The elliptical shape is a side view and the action is through an acceleration or deceleration channel 20, 22. From the top of the preferred embodiment, the channel has an S-curve to it. That means that its lateral motion is based on a mathematical sine wave. The elliptical path is made in conjunction with this sine wave. The change in the radius is small at first, and then grows larger quicker, till midpoint. From there the change becomes smaller, tapering off at the end of the tube portion of the acceleration or deceleration channel 20, 22. In the exit 30 or entrance 32 there is no change in the radius, so the S-curve of the channel 20, 22 is not completely aligned with change in the elliptical path.

Figure 2:
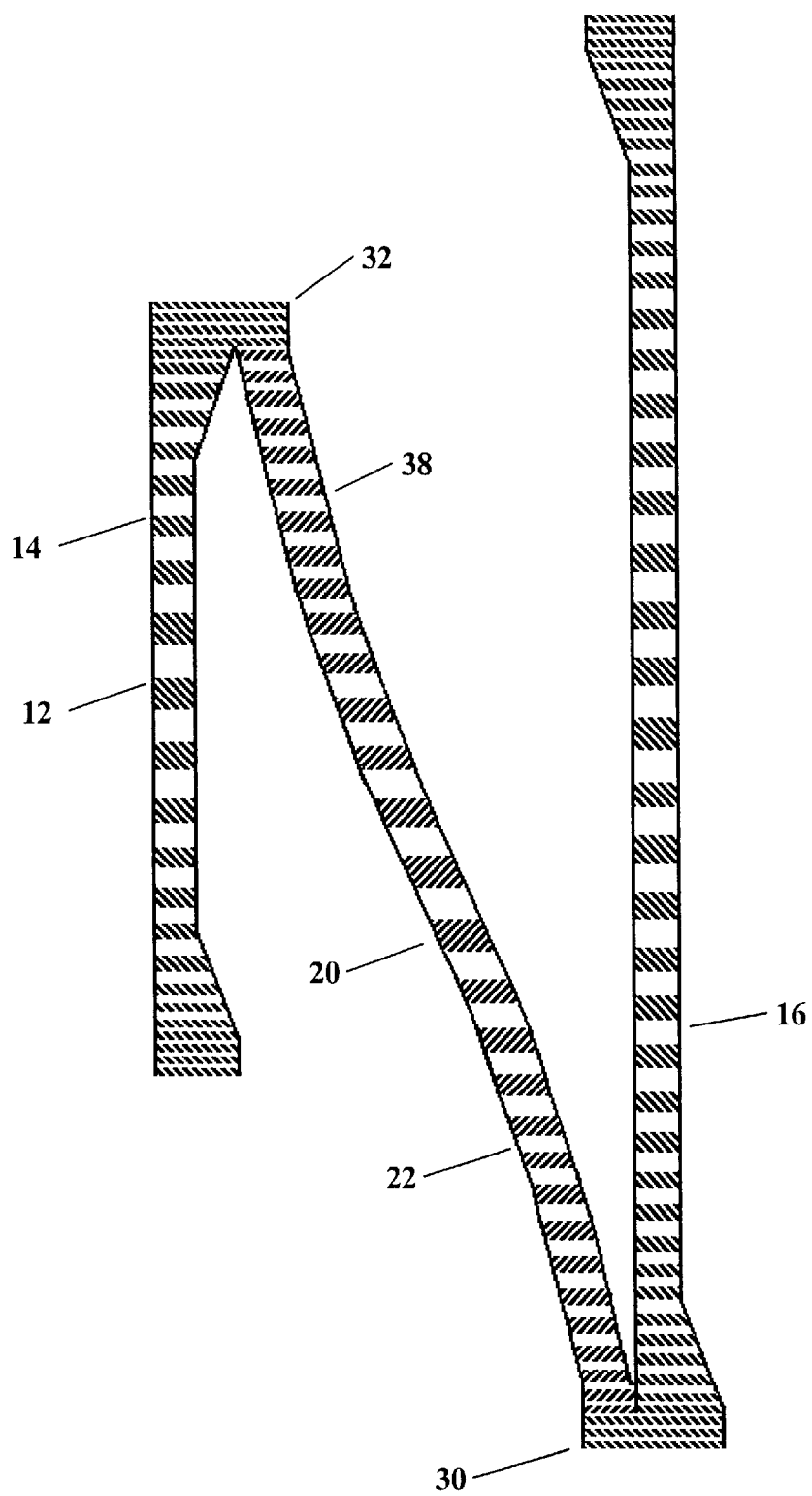
FIG. 2 is a side view of one embodiment of the stack of gears having a transition train in the form of an s-curve.

As noted above, dimensioning the acceleration channel 20 and deceleration channel 22 in the form of an S-curve smooths the preferred transition between gears 12, 16. Such an embodiment is shown in FIG. 2. Here the entrance 32 between the second gear 16 and the transition train 20 must be wide enough to move the gear or loop drive (not shown) out of the ring and into the tube portion 38 of the transition train 20. Once in the tube portion 38 of the train 20, the gear or loop drive may fractionally change its speed until it reaches the exit 30. At the exit 30, the gear or loop drive move out of the train 20 and onto the teeth 14 of the first gear 12. Although it is not shown in FIG. 2, the same principle applies to the deceleration from the first gear 12 to the second gear 16 via the transition train 22; i.e. move from the gear to the entrance, change speed through the tube portion of the train, and move through the exit onto the teeth of the next gear.

It is preferred that the channels 20, 22 be made as long as possible to provide the maximum amount of time to make the transition from the gear through the entrance and from the exit to the other gear. These channels can wrap around and cross, many times if desired. Not crossing them means that an acceleration and deceleration channel have to fit in the space between channels and gears. The channel entrance and exits can overlap, allowing the pinion gear to move out of one gear and into the tube portion of a channel. Once in the tube portion, the gear changes speeds. The design of the transition train involves a number of choices. First, a designer must determine the specific number of teeth that will fit in both the acceleration and deceleration tube. The distance between the gears can vary, and the s-curve will determine how much room the channel entrance and exits will need. Any room remaining is left for the tube. There are only a specific number of teeth that will fit. If the elliptical shape is held to a mathematical sine curve, then the only way to change where the teeth "land" on the next gear in the stack is to adjust the distance between them. This in turn will change the channel. It is noted that, unlike the VCT, there are no "landing errors" in the VCT2.

Figure 3A:
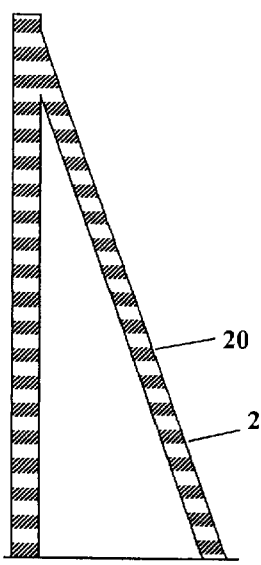
FIG. 3A is a side view of a gear and transition train having straight teeth.
Figure 3B:
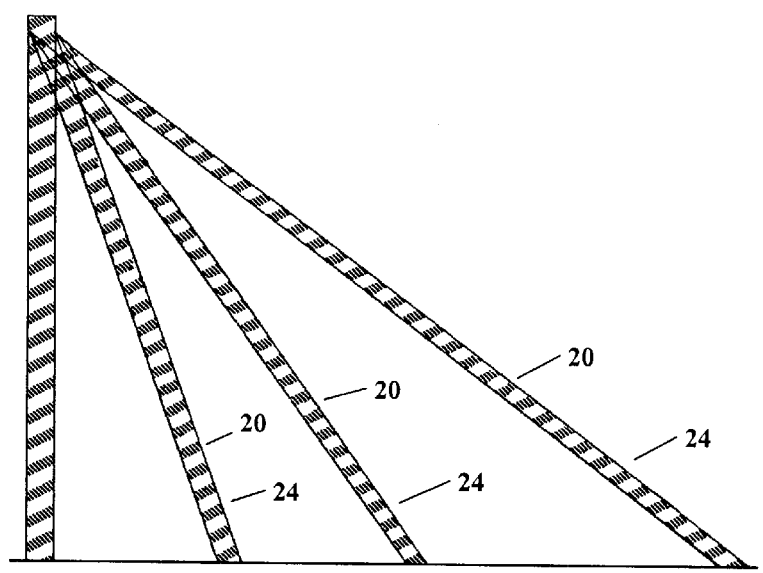
FIG. 3B is a side view of a gear and multiple transition trains having helical teeth.

The teeth 14, 18, 24 of the VCT2 may be straight or helical. As shown in FIG. 3A, the teeth 24 are straight for the transition train 20, while the teeth 24 of FIG. 3B are helical. The impact of helical verses straight teeth is that the straight teeth have the same number regardless of the lateral component. The helical add or subtract the number of teeth as the lateral component increases, allowing for a smoother transition.

Figure 4:
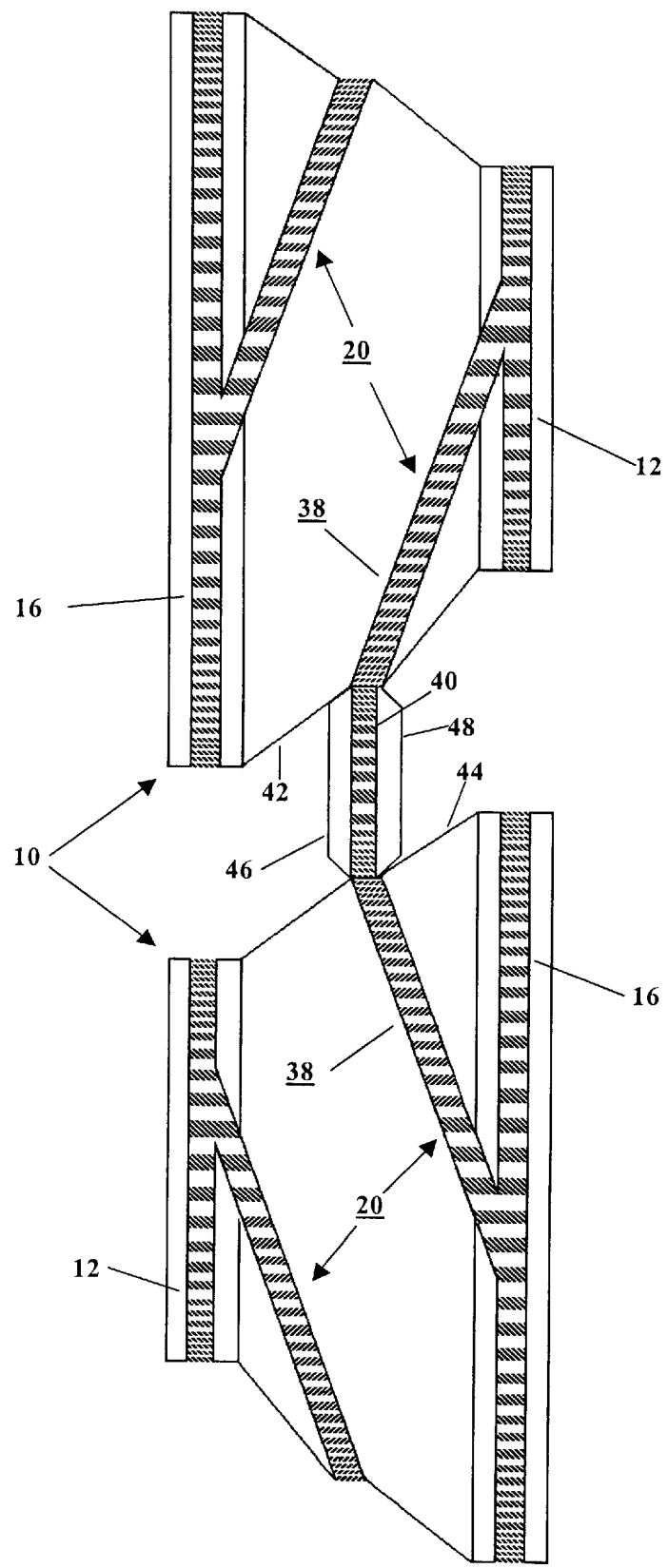
FIG. 4 is a side view of one embodiment of a transmission apparatus of the present invention having two stacks of gears and a pinion gear disposed therebetween.
Figure 6A:
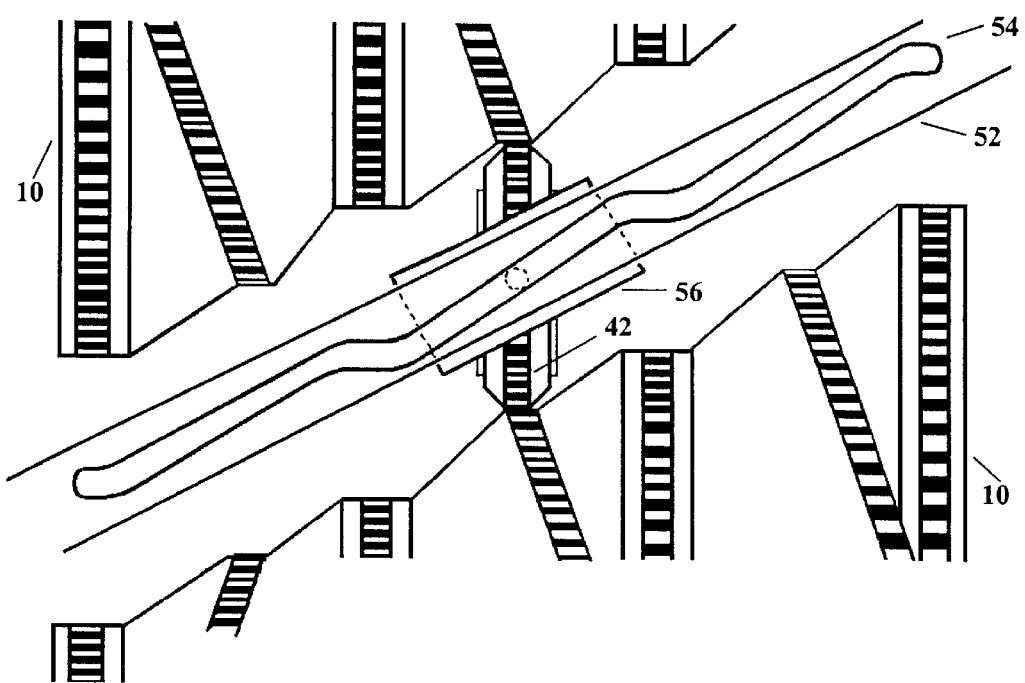
FIG. 6A is a cut away side view of one embodiment of a transmission apparatus of the present invention having two stacks of gears and a pinion gear disposed therebetween and mounted to a rail via a shuttle.
Figure 6B:
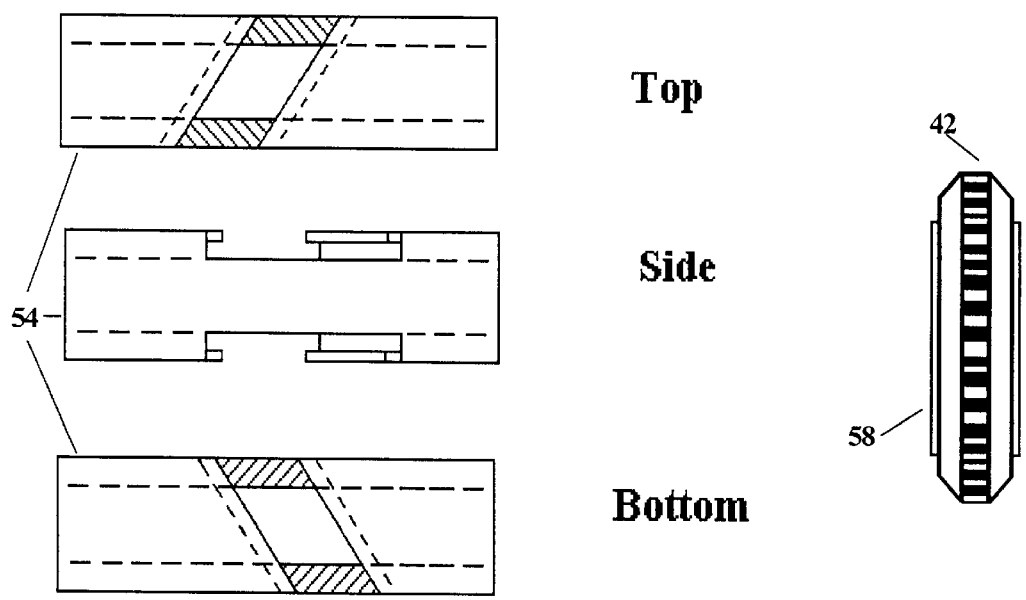
FIG. 6B is a cut away side view of the shuttle of FIG. 6A.

As was the case with the VCT, the VCT2 may utilize a number of control systems to control the movement of a mating gear or loop drive from one gear to another. One such control system is shown in FIG. 4, which shows a mating pinion gear 40 in mating transition trains 20 between mating stacks of gears 10. In such an embodiment, each stack of gears 10 includes a first conic surface 42 disposed between the first gear 12 and the transition train 20 and a second conic surface 44 disposed between the transition train 20 and the second gear 16. This pinion gear 40 is sandwiched between two bumpers 46, 48, which are beveled to match the angle of the conic surfaces 42, 44. When transitioning, these bumpers 46, 48 align with the conic surfaces 42, 44 to push the pinion gear 40 into the entrance (not shown) and to keep the pinion gear 40 straight as it travels through the tube portion 38 of the transition train 20.

A variation of the embodiment of FIG. 4 is shown in FIGS. 5A & 5B. In this embodiment, the pinion gear 40 is rotatably attached to a rocker arm 50, which is in turn slidably attached to a rail 52. The rocker arm 50 allows the pinion gear 40 to move back and forth a small amount to account for the non-linear nature of the lateral motion of the gear 40 through the transition train 19. The gear 40 should slide into a transition train 19 without changing its radius with respect to the common axis. Once in the train 19, the radius of the transition teeth changes, but not necessarily at a constant rate. This is due to the fact that the transition train 19 is formed as a mathematical S-curve in many embodiments. As noted above, the use of the rocker arm 50, or similar device, may be helpful in accounting for this non-linearity.

Despite its usefulness in many applications, a rocker arm 50 is often not the best device to use in a high torque environment. One embodiment of the control system that is adapted to such use is shown in FIGS. 6A–6D. In this embodiment, the rail 52 includes a track 54 disposed therein. This track 54 follows the back and forth lateral path of the pinion gear 42 as it is moved along rail 52. A shuttle 56 is slidably attached to the rail 52. The shuttle 56 includes a slidably attached bearing block 58, to which the pinion gear 40 is rotatably attached, and a pin 60 that is dimensioned to fit within the track 54.

In operation, the rail 52 is disposed in relation to the stack of gears such that the pinion gear 40 is in contact with the gear stack 10 and the pin 60 is disposed within the track 54 such that the pin 60 exerts a guiding force to control the location of the bearing block and thus the gear. The bearing block is mounted on the shuttle to hold it in position on the rail while it moves and track 54. The shuttle 56 then slides on the rail 52 with the pin 60 controlling the location of the bearing block 58 on the rail 52 such that movement along the rail will passively place the gear to its desired location upon the stack of gears 10.

In some embodiments of the invention, the control system involves the use of vector loading in a manner similar to that used in connection with the VCT. Here, the control system includes a control surface and rail disposed adjacent to the channel entrance for guiding the vector-loaded gear. The primary function of the control surface and rail in these embodiments is to provide a passive guide from one gear to a channel entrance, and from a channel exit to another gear.

Figure 7A:
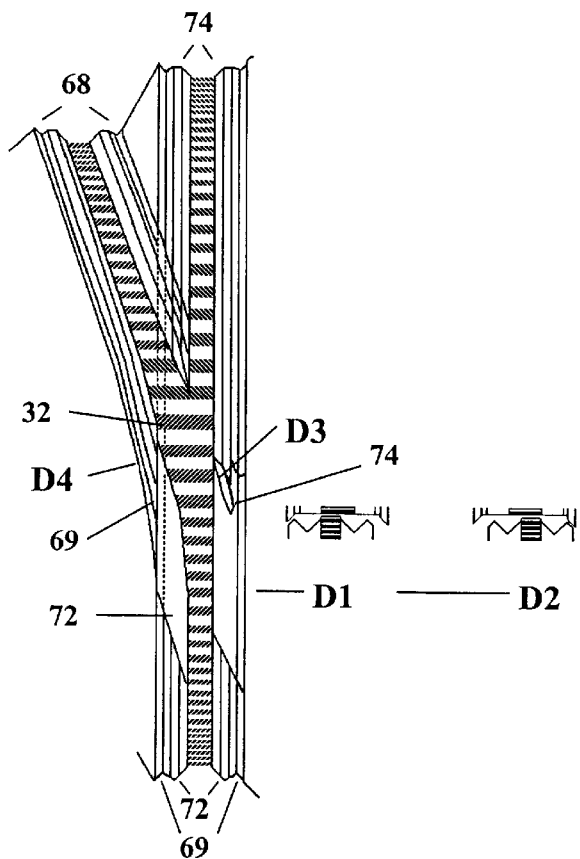
FIG. 7A is an exploded cut away view showing the operation of one embodiment of the control system utilizing a control wheel to move a gear into a channel entrance.
Figure 7B:
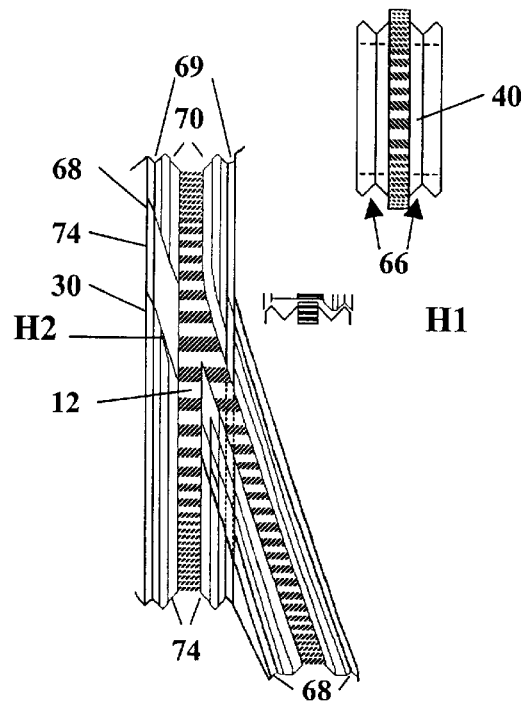
FIG. 7B is an exploded cut away view showing the operation of the embodiment of FIG. 7A to move a gear into a channel exit.

In some embodiments, where the teeth of the gears are straight, there is no vector loading and a control wheel is manipulated by a control system to guide the gear 40 through the entrance 32 and exit 30. Referring now to FIGS. 7A & 7B, such a control system utilizing a control wheel 66, a control surface 68, a control slot 69, and a rail 70 is described. The pinion gear 40 has a bumper integral to the control wheel 66. As the gear 40 is approaching an entrance 32, a transition zone 72 opens. The gear 40 can stay on course, as shown at cross section D2, or move left at point D1 into the entrance. By point D3, an alignment surface 74 also provides support and the gear 40 is pulled into the channel at D4 by the control surfaces. The control and alignment surfaces 68, 74 on both sides of the bumpers "squirt" the gear through channel. The control surface 68 is then withdrawn, so as not to incur wear.

The exit 30 is also passive. The gear 40 has arrived at the next diameter and changes on the stress of the teeth stop at the end of the tube portions of the acceleration or deceleration channels. The transition zone is preferably small, providing only enough room to allow the control wheel 66 to cross the alignment surface 74. Where there is a break in the right control slot at point H1, the left side of the control wheel is against the edge of the transition zone at H2. Here, the channel exit 30 crosses the control and alignment surfaces and merges with the gear 12. The teeth always stay in contact, as the transition zones are only large enough for the control wheel 66 to cross over to another control surface 68.

Figures 8A, 8B:
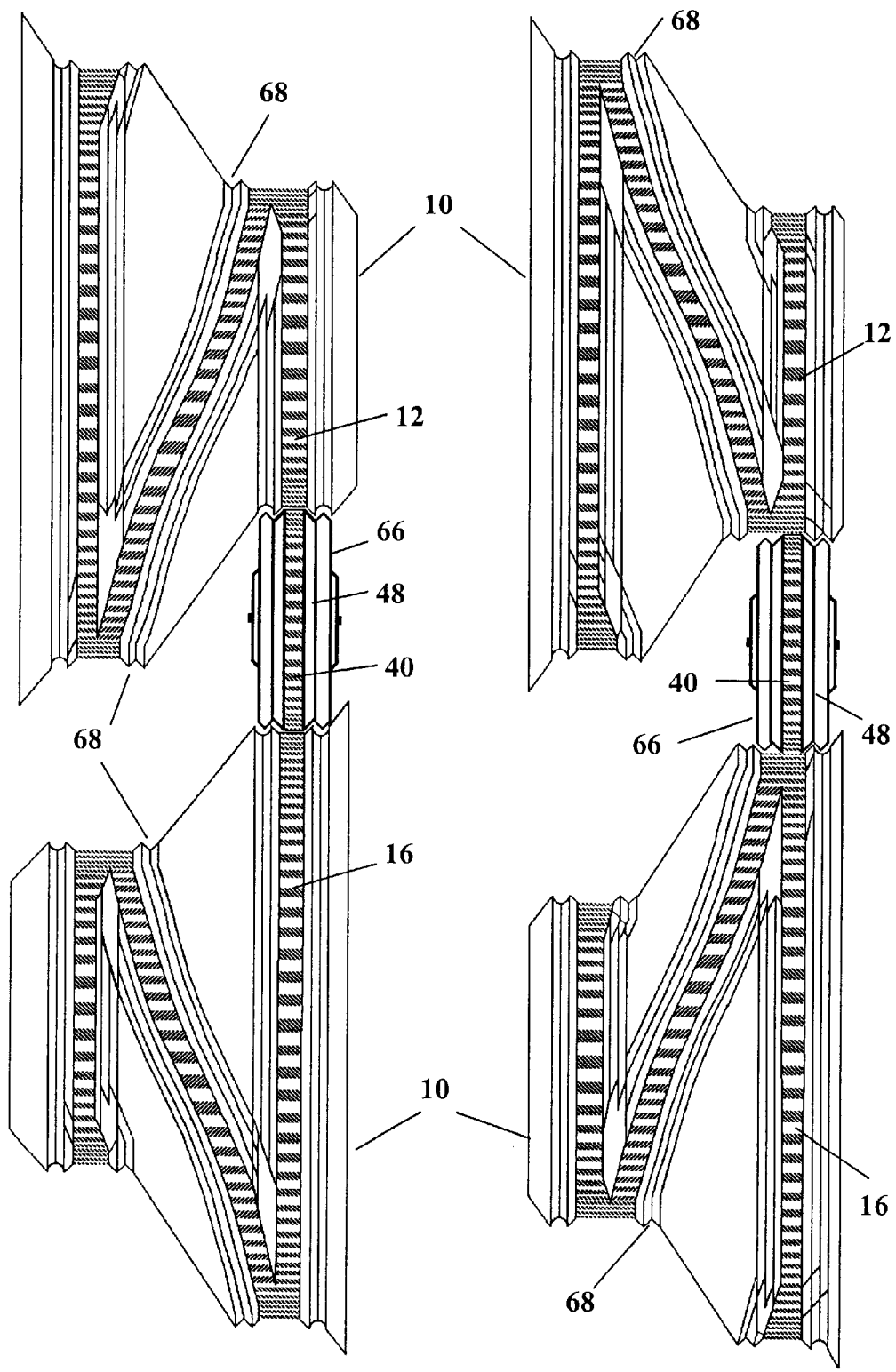
FIG. 8A is a side view of one embodiment of the invention in showing one control system and the gear disposed between a first and second gear of opposed stacks of gears.
FIG. 8B is a side view of the embodiment of FIG. 8A showing the gear engaging control surfaces at the entrances of the first and second gears.

FIGS. 8A and 8B show one embodiment of the system of FIGS. 7A and 7B in which the pinion gear 40 is disposed between two stacks of gears 10. FIG. 8A shows the pinion gear 40 disposed between the first gear 12 of stack of gears 10 and the second gear 16 of the other. The transition zones on the first gear 12 and the second gear 16 do not align and the pinion gear 40 stays on track. In FIG. 8B, both transition zones are aligned and the pinion gear 40 can cross. Once in the acceleration channel 20 and deceleration channel 22 of the other stack, the control surface and alignment surface provide dual engagement of the control wheel and bumper. The control surface can be above the alignment surface, but never below. This would make the corresponding wheel 66 smaller then the bumper 48. It always has to be above the teeth to cross the transition zone.

Figures 8C, 8D:
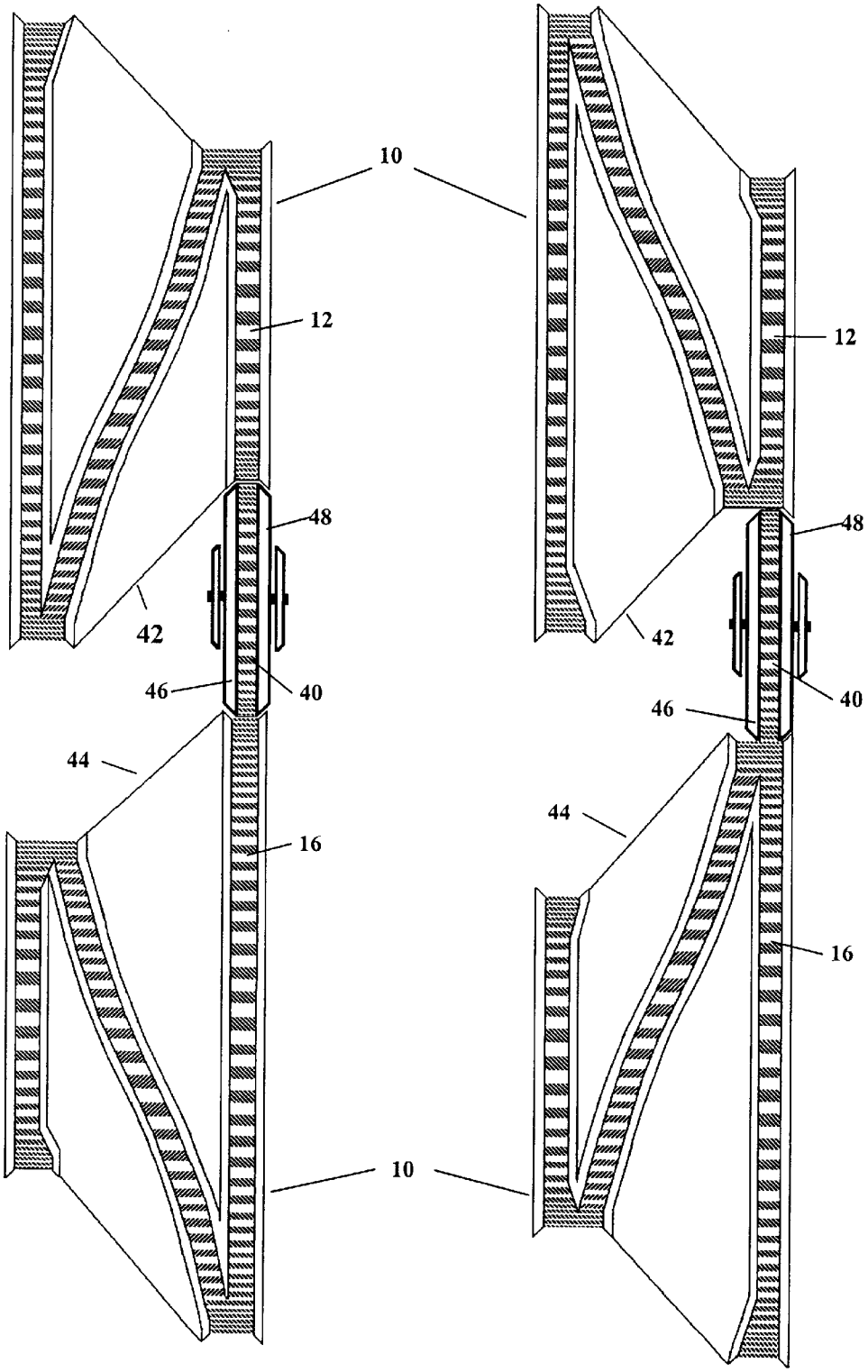
FIG. 8C is a side view of one embodiment of the invention in showing another control system and an idler gear disposed between a first and second gear of opposed stacks of gears.
FIG. 8D is a side view of the embodiment of FIG. 8C showing the gear engaging control surfaces at the entrances of the first and second gears.

As shown in FIGS. 8C and 8D, another embodiment of the using bumpers 46,48 may also be used when the pinion gear 40 takes the form of an idler gear 40 disposed between two stacks of gears 10. In these embodiments, the push by the bumpers 46,48 is from both the first and second gears 12, 16 on the respective stacks of gears 10. When the transition zones are not aligned as in FIG. 9A, then the pinion gear 40 stays on track. When the transition zones align as in FIG. 9B, then pinion gear 40 may cross over if acted upon by an a motion control force.

As shown in FIGS. 8C and 8D, another embodiment of the using bumpers 46,48 may also be used when the pinion gear 40 takes the form of an idler gear 40 disposed between two stacks of gears 10. In these embodiments, the push by the bumpers 46,48 is from both the first and second gears 12, 16 on the respective stacks of gears 10. When the transition zones are not aligned as in FIG. 9A, then the pinion gear 40 stays on track. When the transition zones aligns as in FIG. 9B, then pinion gear 40 may cross over if acted upon by an a motion control force.

The difference between having a control wheel on the pinion gear verses just the bumpers is that the control adds mass, and more certainty. The bumpers are lighter, but if the outside motion control fails, an incomplete transition could cause a destructive collision.

Figure 9A:
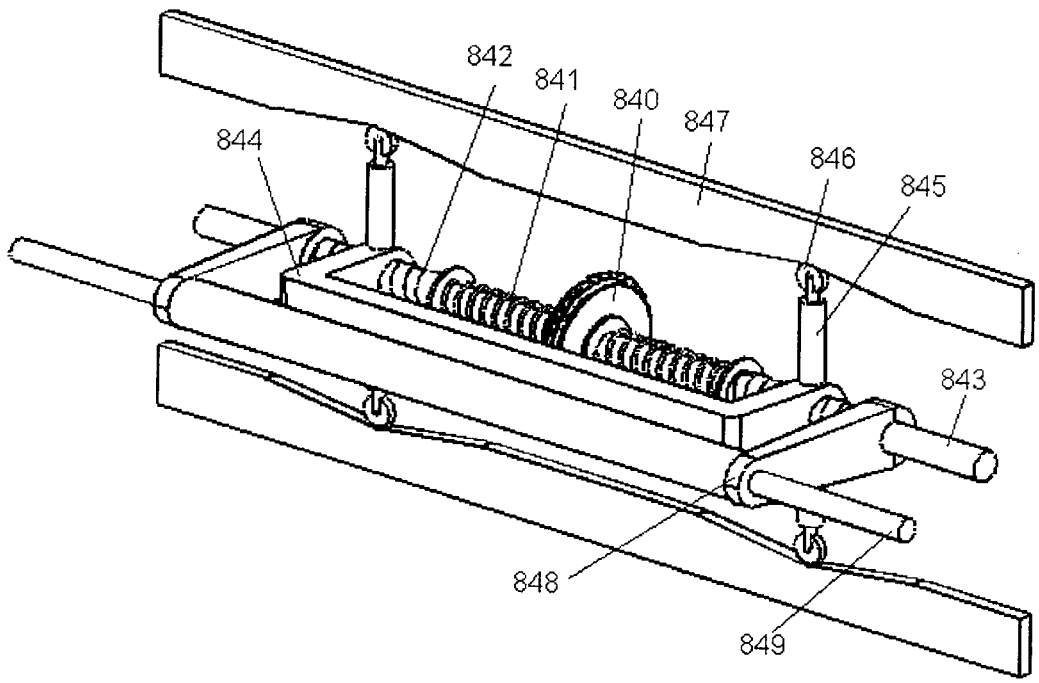
FIG. 9A is an isometric view of a mechanical control system utilizing a spring and control arm.
Figure 9B:
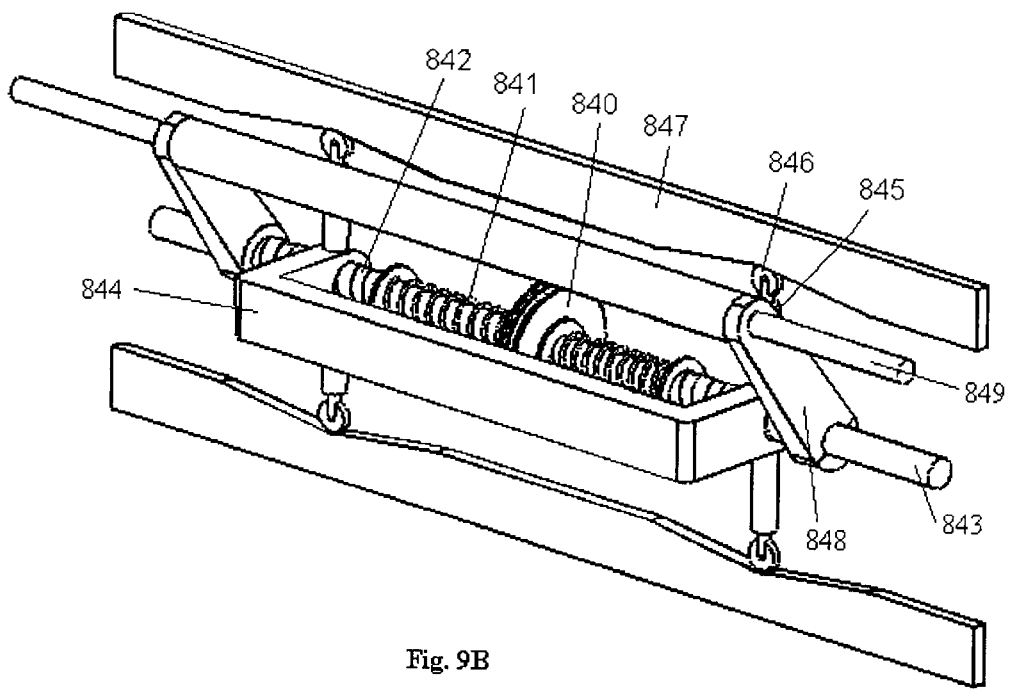
FIG. 9B is an isometric view of the mechanical control system of FIG. 9A with the control arm in an up position.

It is noted that the other control systems used with the VCT may also be used with the VCT2. For example, as shown in FIGS. 9A and 9B, the gear 40 has a threaded tube 842 on both sides, and a splined shaft 843. The threaded tube 842 is fed into a mounting bracket 844, which includes four spring-loaded posts 845. Two of these posts 845 extend from the top of the bracket 844 and two extend from the bottom, with each having resistance wheels 846 at their ends. These wheels 846 follow a resistance track 847. The threaded tubes 842 are attached to the speed control arm 848, and the movement of this arm 848 turns the threaded tube 842. The speed control arm 848 has a guide shaft 849 that is raised or lowered to operate the arm 848.

The springs 841 on each side of the gear 840 allow the gear 840 to move independently due to vectoral loading and must be heavy enough to provide a resistance to be overcome. As shown in FIG. 9B, when the speed control arm 848 is raised, the threaded tube 842 causes the control springs 841 to be compressed on one side and relieved on the other, moving the gear 840 sideways inside the mounting bracket 844. This movement is effectively reversed when the control arm 848 is lowered, as the threaded tube 842 will rotate in an opposite direction. This movement of the gear 840 will cause the gear 840 to move to the side of the gear (not shown) and allow the control wheels 816 to engage the slots 813. When the gear 840 moves through the channel 814, it pushes the mounting bracket 847 along with it causing the resistance wheels 846, which normally hold the bracket 847 and the gear 840 in the center of the ring, to roll to the next position along the bracket 847.

In some such mechanical embodiments, the mounting bracket 847 and control arm 848 are replaced with a linear motor. Such a linear motor configuration would preferably maintain a constant resistance to hold the gear in the middle of the ring, but could be overcome with the vectoral force, eliminating the need for the springs 841.

Figure 10A:
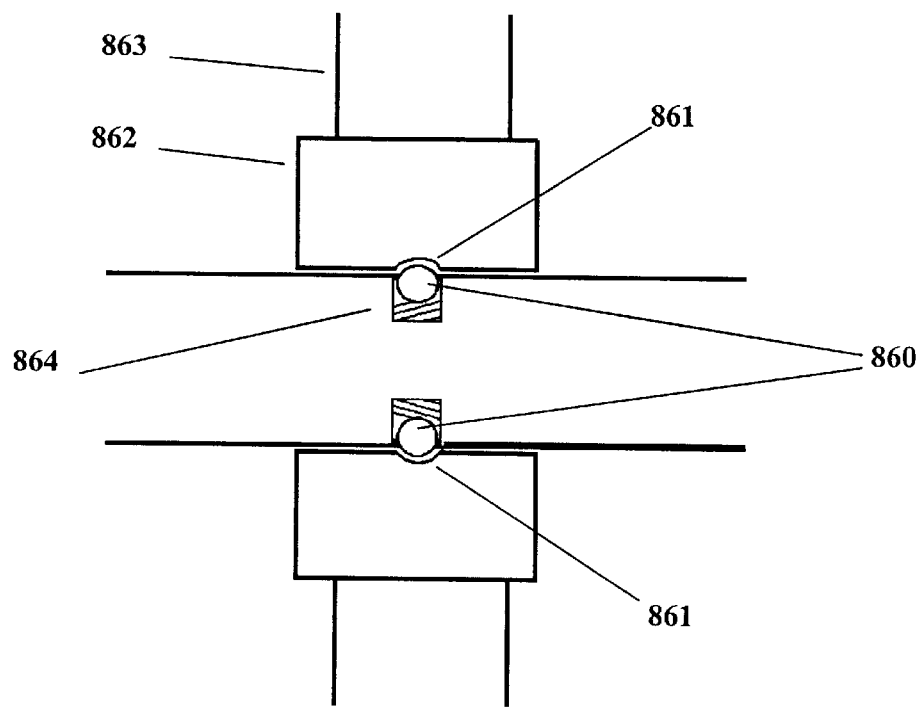
FIG. 10A is a cut away view of a mechanical control using a spring-loaded ball.

In still other embodiments, the resistance control is a detent within the inside hub of the gear and a ball extending partially from the surface of the output shaft. As shown in FIG. 10A, the ball 860 is dimensioned to mate with the detent 861 within the inside hub 862 of the gear 863 and includes a spring 864 that exerts a force upon the gear such that a sufficient amount of lateral force is required to push the ball 860 down before the gear 863 can move. In some embodiments the force upon the balls is exerted by compressible substance, such as neoprene, which creates a cushion that can be compressed under a load.

Figure 10B:
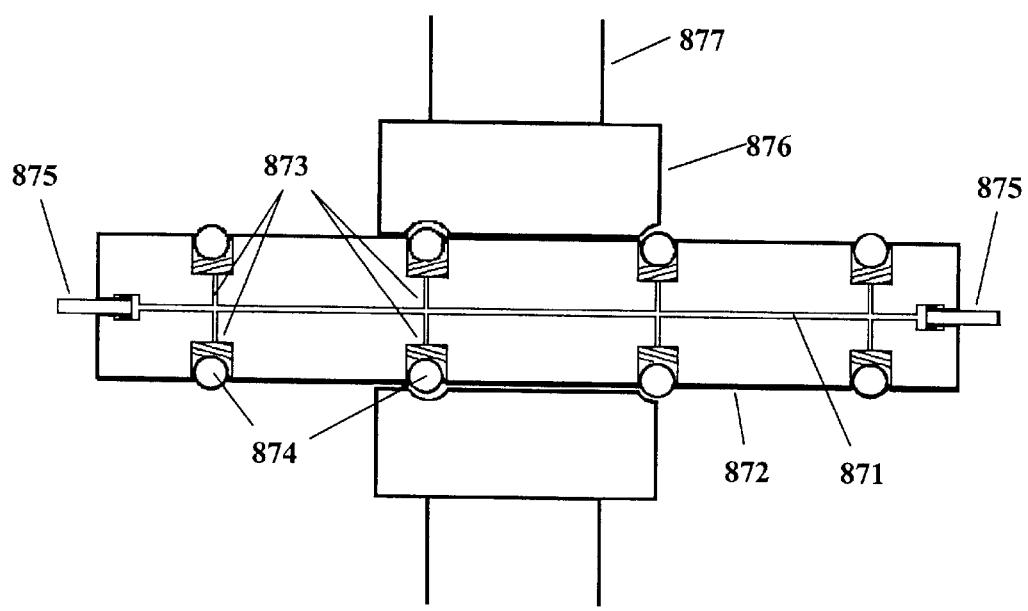
FIG. 10B is a cut away view of a mechanical control using a piston and fluid in communication with a ball.

In some embodiments, the force applied by the ball is generated by a piston in fluid communication with the ball and allows the force to be varied by controlling the pressure against the ball. As shown in FIG. 10B, it is preferred that such an embodiment include a hydraulic line 871 running through the center of the shaft 872 with connecting tubes 873 in communication with a plurality of balls 874. The connecting tubes 873 have a piston 875 at each end. When these pistons 875 experience a quick sharp strike, the pressure on the balls 874 is momentarily increased and lateral motion is transmitted to the gear hub 876. When the objective is to move the hub 876 the fraction of an inch required to move the gear into the control slot (not shown), the force has to be very short-lived and, once the gear 877 is moving, the struck piston is allowed to return to its starting position. However, it is recognized that holding the pistons 875 firmly would prevent the gear 877 from changing speeds. In this manner, the system could work like a "Jake Brake" on a truck.

The above control system could be incorporated into either a smooth shaft or a splined shaft and is advantageous as putting the controlling components on, or in, the shaft frees the pinion gear 40 of "overhead" mass. The lighter the mass, the greater the upper limit that it can change speeds.

Figure 11B:
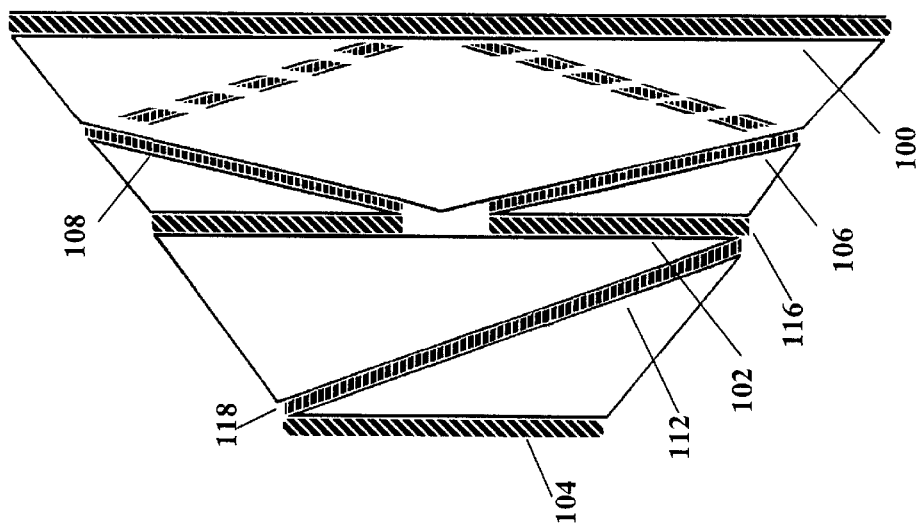
FIG. 11B is a side view of the embodiment of FIG. 11A.
Figure 11A:
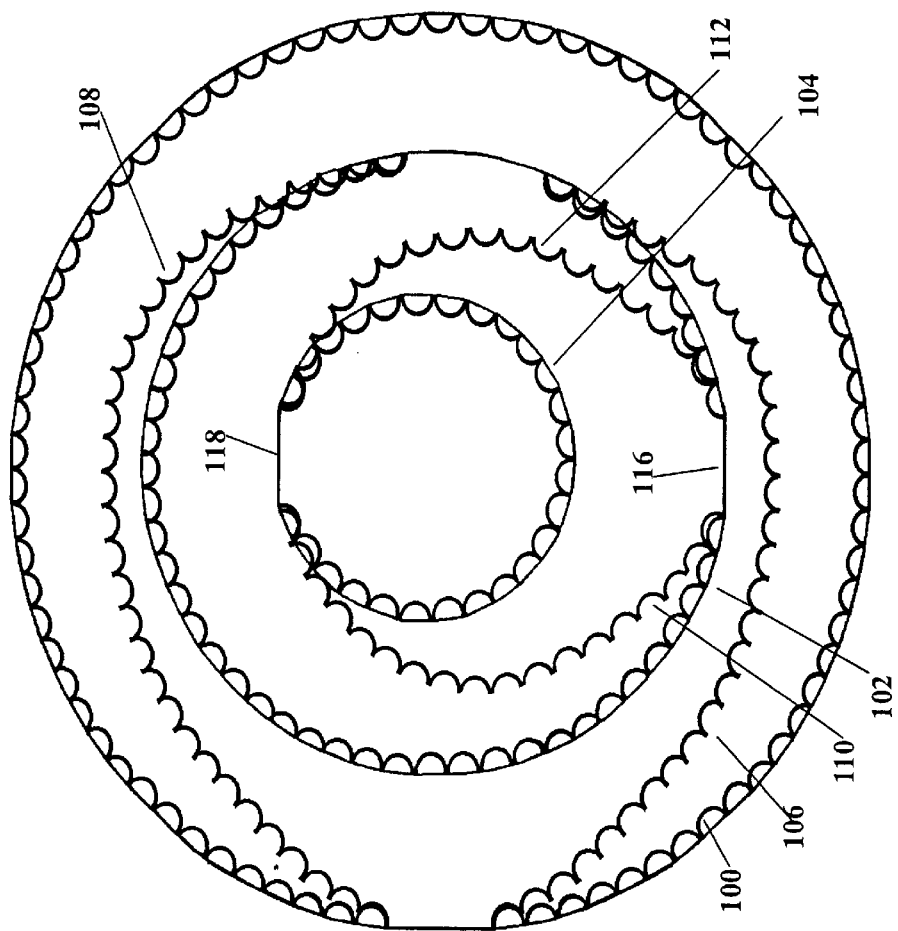
FIG. 11A is a top view of one embodiment of the invention for use with a continuous loop drive.

In some embodiments, the stack of gears 10 of the VCT2 are dimensioned to mate with a continuous loop drive, such as a chain, toothed belt, V-belt or a flat belt drive. As shown in FIGS. 11A and 11B, the gears in such an embodiment may take the form of sprockets 100, 102, 104 having teeth dimensioned to mate with the desired continuous loop drive (not shown). Sprockets 100, 102, 104 have transition sprockets 106, 108, 110, & 112 between them. The transition sprockets 106, 108, 110, & 112 are in pairs, which pairs represent tube portions of acceleration and deceleration channels. Finally, blank spaces 116, 118 are provided between transition sprockets 110 and 114 in order to provide the loop drive with enough play in to allow it to bend and flow into the adjacent transition sprocket. Accordingly, these blank space 116, 118 serve as the channel entrances and exits.

Figure 12A:
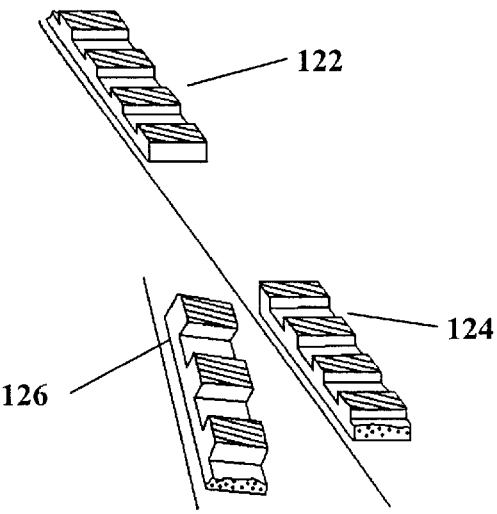
FIG. 12A is an exploded isometric view of a sprocket and transition sprocket for use in an embodiment for use with a toothed belt.
Figure 12:
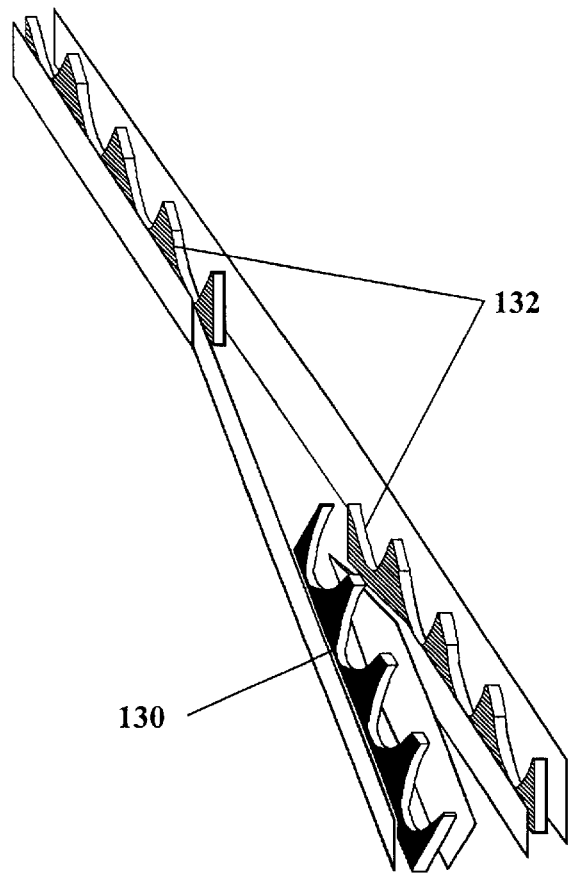
FIG. 12B is an exploded isometric view of a sprocket and transition sprocket for use in an embodiment for use with a chain drive.

The relationship between sprockets and transition sprockets is demonstrated in FIGS. 12A & 12B. In FIG. 12A, a toothed belt sprocket 122, 124 is shown having has a transition sprocket 126. Similarly, FIG. 12B shows a transition sprocket 130 that is twisted with respect to sprocket 132, which is here disposed at an angle.

Transposed sprockets can have a tight chain belt between them. If the acceleration and deceleration channels are mirror images of each other, then they change at the same rate, therefore, the china/belt stays as the same length. For transposed VCT2 sprockets, the channels have to be all the same length in order to change speeds at the same rate of change. This means that a small sprockets transition channel should be the same number of teeth as a larger sprockets transition channel. One way that this can be made to work is to make the transition channels cross. In such an embodiment, there would be a blank space at the point of crossover. This is an attractive option if the number of sprockets is great and the larger sprockets need a longer transition channel then the smaller transition sprockets can have in the allotted space For opposed sprockets, it is preferred that the loop drive be kept tight. Bicycles have a spring-loaded device to keep the chain tight. However, such a system would not be desired for use with the VCT2. Rather, a chain/belt rake on a rocker arm would push the top and bottom over onto in opposite direction respect of which sprocket they are feeding with a belt/chain tensioner keeping the drive in tension during the transition. In embodiments utilizing a timing mechanism, they move together. In those without such a timing mechanism, they move separately when the channel entrances are in position, but will also require additional play in order to work most effectively.

The VCT2 may be used as a component in a number of different gear trains and transmission systems. These will be described herein showing the typical cone of the VCT, although it is understood that the stack of gears is actually substituted for the cone in embodiments of the present invention.

As was the case with the VCT, the VCT2 may be configured to allow energy to be cascaded from one cone. These configurations imply energy transmitted from one component to another as opposed to groups of components as in planetary systems. The VCT utilized two such cascading configurations, referred to as "Graham" and "Felch" configurations. As noted above, the VCT Felch cascade will not work with a VCT2 because the cone cannot move independently and lateral movement between inner and outer shaft is undesirable. However, the Graham configurations shown in FIGS. 13A & 13B may utilize the advantages of the VCT2.

Figure 13A:
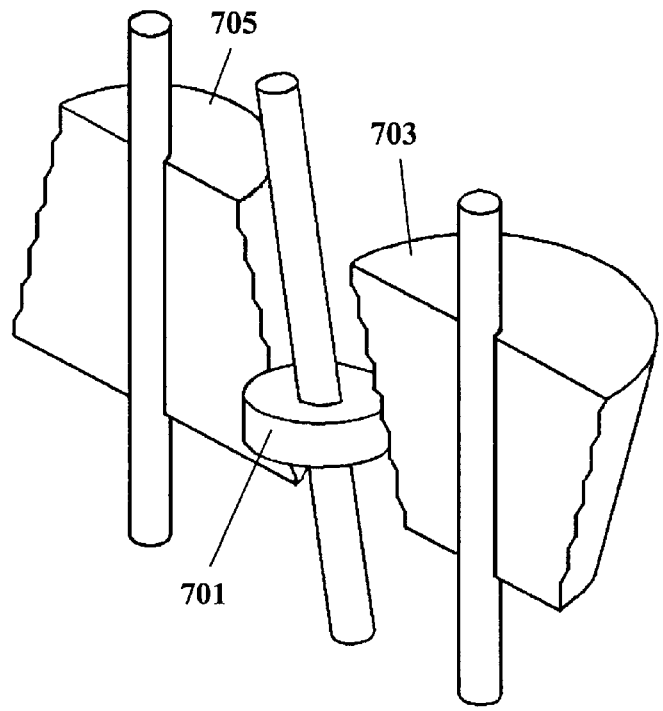
FIG. 13A is an isometric view of a Graham cascading configuration with a gear in a bottom position.
Figure 13B:
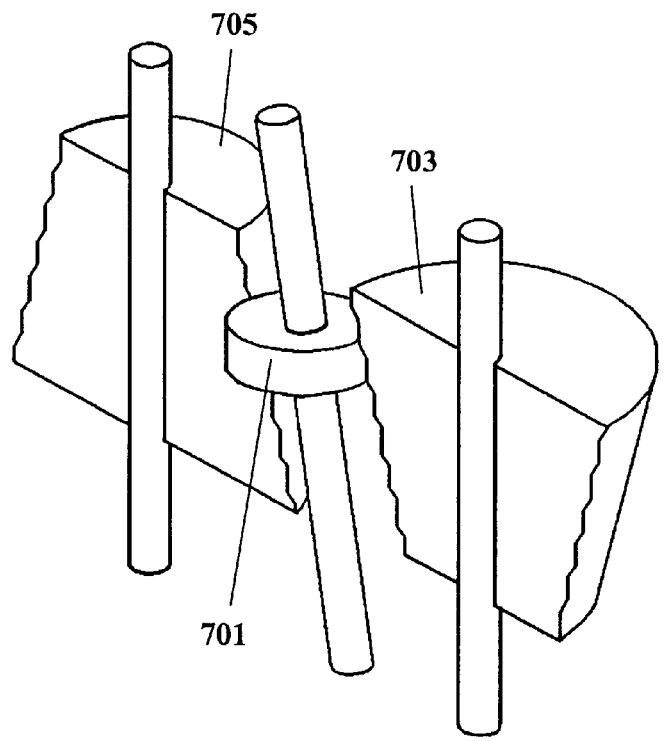
FIG. 13B is an isometric view of a Graham cascading configuration with a gear in a top position.

As shown in FIGS. 13A & 13B, the simplest Graham configuration is a gear 701 between two external stacks of gears 703, 705, which is, literally, two synchronized transmissions in one. Since the external stacks of gears 703, 705 share the same pinion gear 701, the synchronization is inherent, with the effect being that differences in speed are multiplied. The greatest advantage of this configuration has is that the gear 701 transmits energy between the stacks of gears 703, 705 along its surface instead of through its hub. This gives the configuration a higher torque capacity.

FIGS. 13A shows the gear 701 at a bottom position between the two stacks of gears 703, 705, while FIG. 13B shows the gear 701 at a top position.

FIGS. 14A–15C show two types of planetary systems utilizing the cones and gears of the present invention. The advantage of a planetary system is its compactness and ability to transmit more torque through multiple planetary gears. It is noted that, although each of the planetary systems are described herein as having only two planetary gears, more than two planetary gears may be utilized. Regardless of the number of planetary gears, however, the effect of such a planetary system is that the teeth on the gears may be smaller and the system may be faster.

Figure 14A:
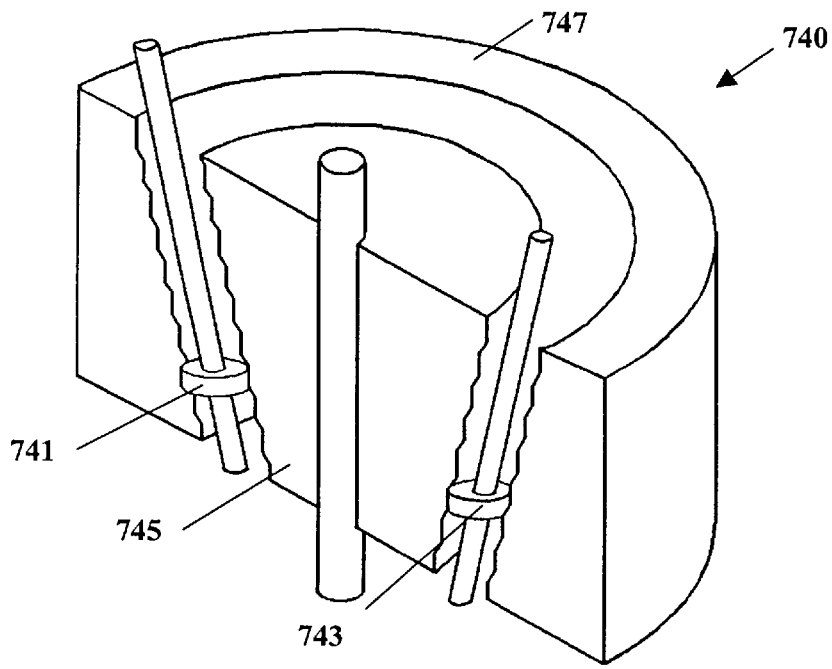
FIG. 14A is an isometric view of a Tatham planetary system with planet gears at the bottom of the stacks of gears.
Figure 14B:
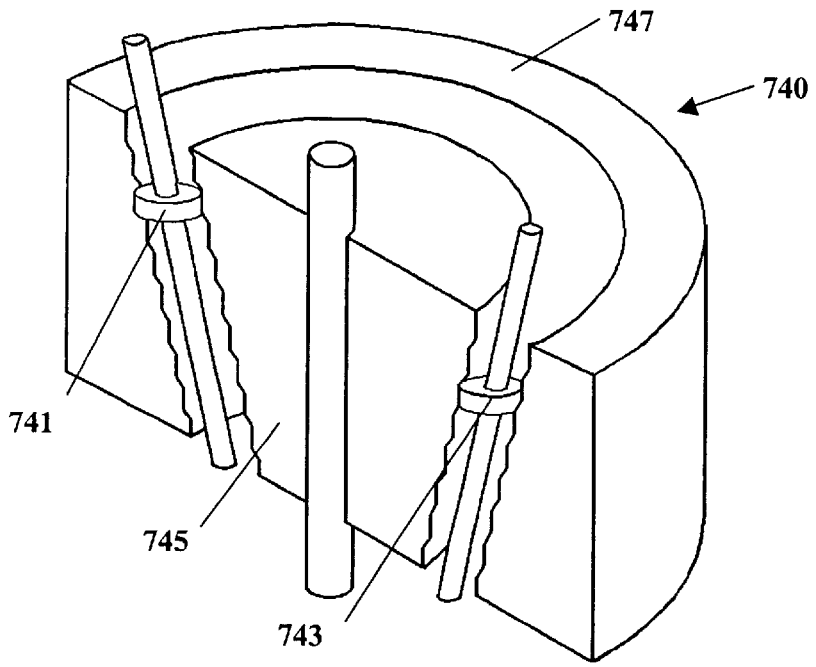
FIG. 14B is an isometric view of a Tatham planetary system with planet gears at the top of the stacks of gears.
Figure 15A:
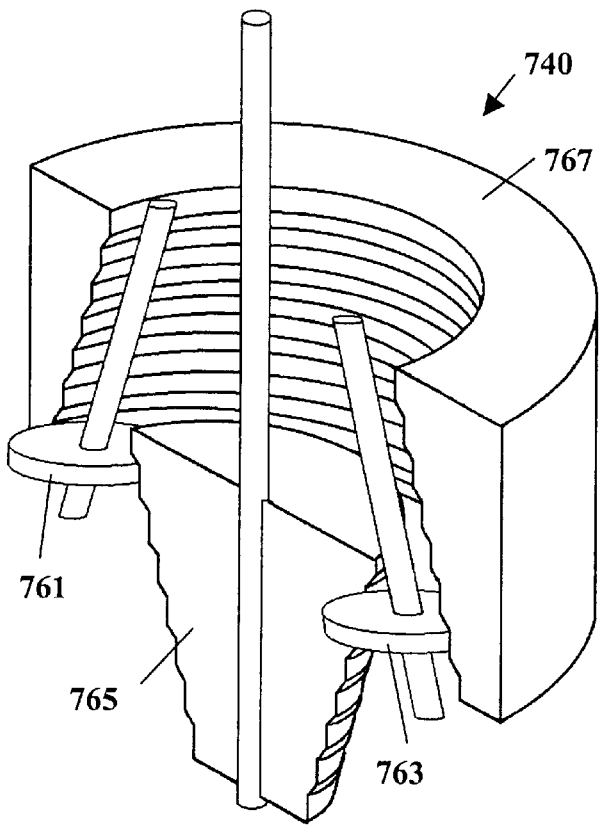
FIG. 15A is an isometric view of an Ashbey planetary system with planet gears at the bottom of the ring stack of gears.
Figure 15B:
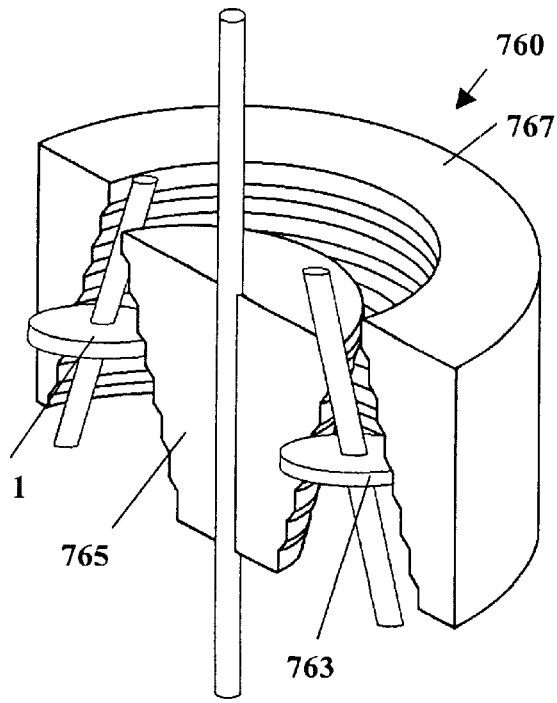
FIG. 15B is an isometric view of an Ashbey planetary system with planet gears at the middle of the ring stack of gears.
Figure 15C:
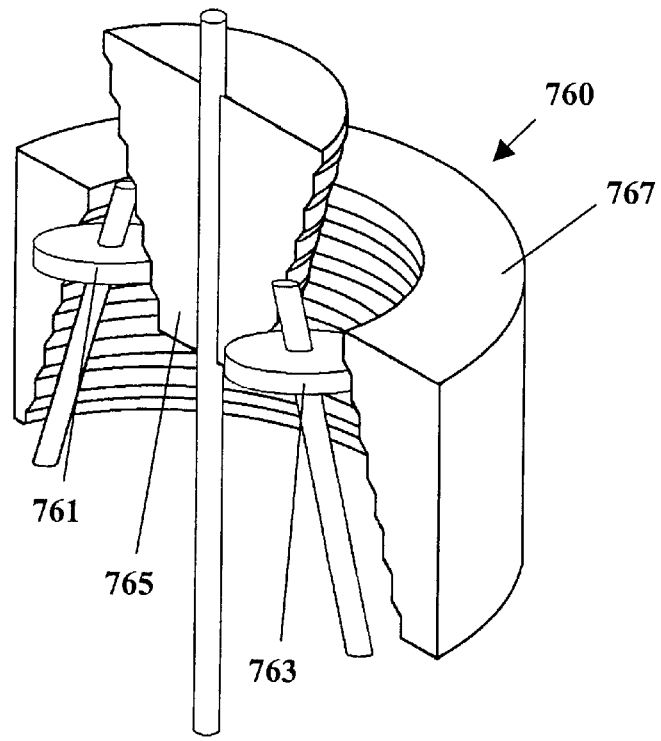
FIG. 15C is an isometric view of an Ashbey planetary system with planet gears at the top of the ring stack of gears.
Figure 15D:
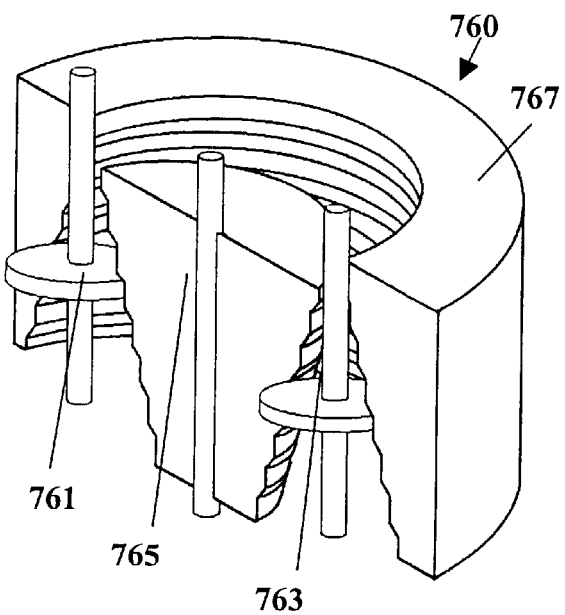
FIG. 15D is an isometric view of an Ashbey planetary system with the axis of the pinion gear parallel with the axis of the pinion gear shaft.

FIGS. 14A & 14B show a Tatham planetary system 740 and FIGS. 15A–15C show an Ashbey planetary system 760. In the VCT, the Tatham configuration had to be moving a pinion between an external cone parallel with an internal cone. The VCT2 version of the Tatham configuration is similar in this respect, as a pinion is between an external stack of gears parallel to an internal stack of gears, with the pinion being the only component to move.

The Ashbey configuration of the VCT is a pinion between opposed internal and external cones. The cones had to move relative to that conic gear; i.e. when one moved to a larger diameter, the other moved to a corresponding smaller diameter. This is the only way an Ashbey surface interface could be used in a planetary configuration. In the VCT2, the motion is the same, as the stacks move relative to the gear, but the surface distinctions are irrelevant.

Each system 740, 760 may be differentiated by the relative controlling motion of the planet gears 741, 743 & 761, 763. In the Tatham, the planet gears 741, 743 move and the cone 745, 747 are stationary. In the Ashbey, two of the components have to move: the ring stack of gears 767 and sun stack of gears 765, the ring stack of gears 767 and planet stacks of gears 761, 763 or the sun stacks of gears 765 and planet gears 761, 763.

As shown in FIGS. 15A–15C, the Ashbey planetary system includes an internal ring stack of gears 767 that is the planetary ring, an external sun stack of gears 765 that is the planetary sun, and a pair of gears 761, 763 that are the planets. The position of the ring stack of gears 767 and sun stack of gears 765 is such that the angular faces of the cones 765, 767 are inverted relative to each other. FIG. 15A shows the planet gears 761, 763 at the bottom of ring stack 767 and the top of the sun stack 765. FIG. 15B shows the planet gears 761, 763 in the middle of each stack of gears 765 and 767. To obtain this position, the ring stack of gears 767 must move downward relative to the sun stack of gears 765 movement upwards. FIG. 15C shows the planet gears 761, 763 moved to the top of the ring stack of gears 767 and to the bottom of the sun stack of gears 765. To obtain such a position, the ring stack of gears 767 and planet gears 761, 763 must move downward relative to the sun stack of gears 765.

As shown in FIGS. 14A & 14B, the Tatham planetary system 740 has planet gears 741, 743 between an internal ring stack of gears 747 and external sun stack of gears 745. The angular faces of these stacks of gears 745, 747 are aligned with each other. FIG. 14A shows the planet gears at the bottom of the stacks of gears 745, 747, while FIG. 14B shows the planet gears at the top of the stacks of gears 745, 747.

As can be seen from FIGS. 15A–15C, the Ashbey planetary system 760 has a larger range of gear ratios then the Tatham planetary system 740, but the Tatham planetary system 740 is much simpler to control since only the planet gears 741, 743 are allowed to move.

Figure 16A:
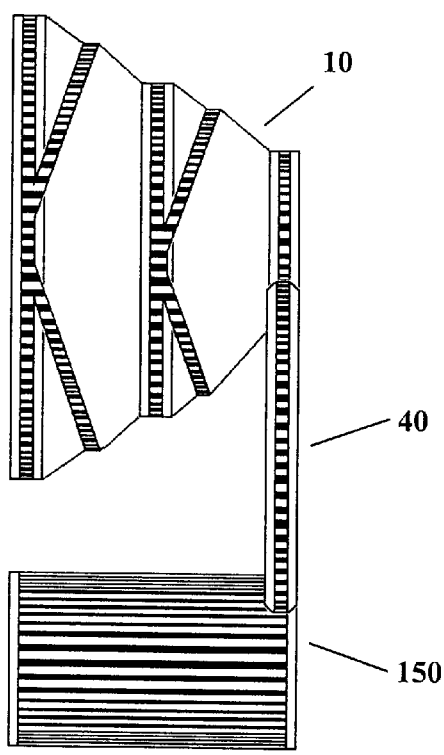
FIG. 16A is a side view of a Persson system with the pinion gear in contact with a first gear.
Figure 16B:
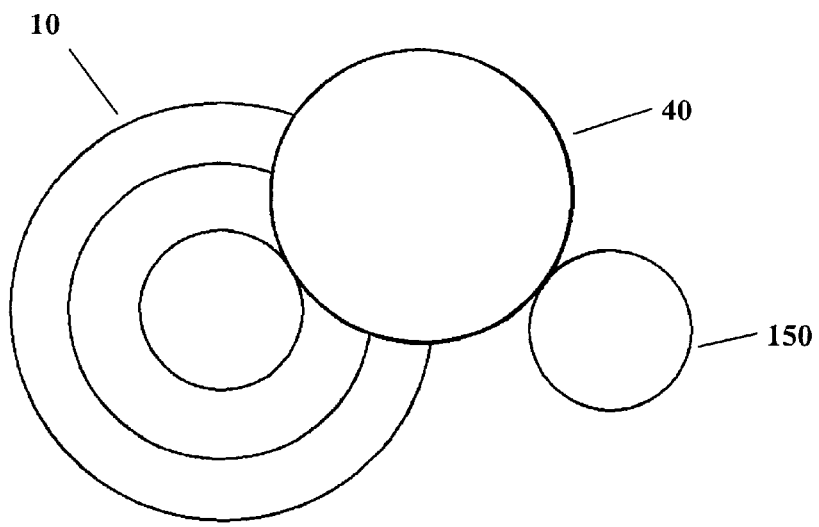
FIG. 16B is a top view of the Persson system of FIG. 16A.
Figure 16C:
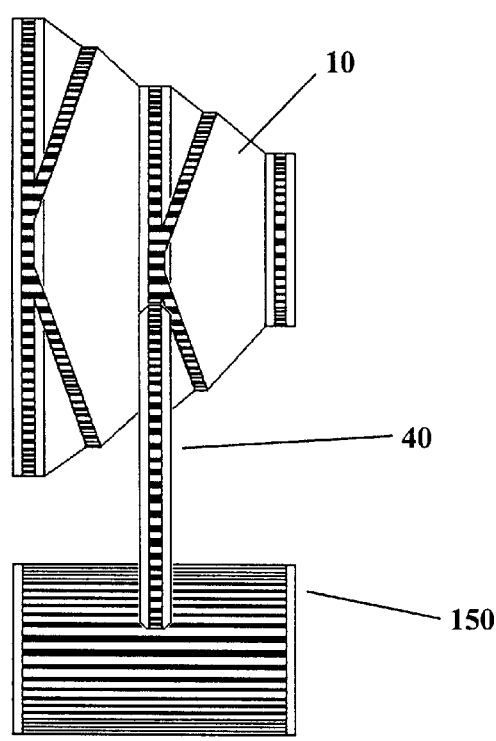
FIG. 16C is a 16A is a side view of a Persson system with the pinion gear in contact with a second gear.
Figure 16D:
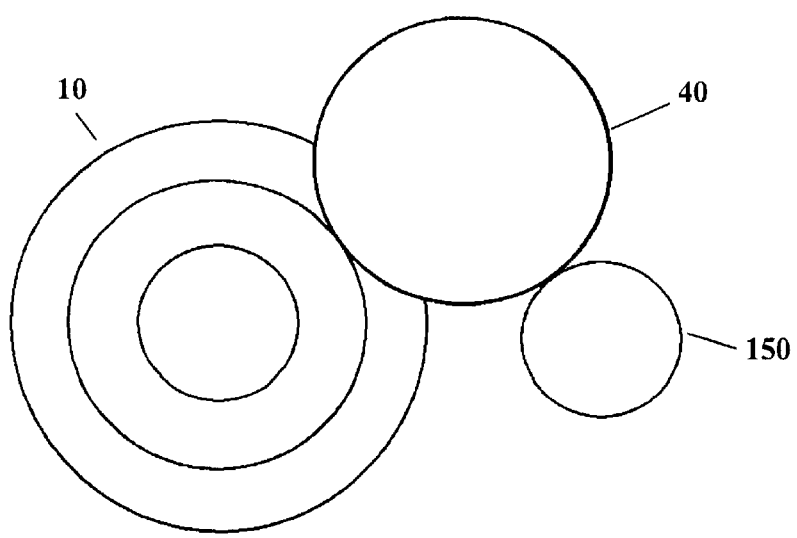
FIG. 16D is a top view of the Persson system of FIG. 16C.

As shown in FIGS. 16A & 16B, another possible configuration is named the "Persson" configuration. This configuration has three power transmitting parts; a stack of gears 10, a pinion gear 40, which serves as an idler gear, and an output gear 150. In this configuration, the output gear 150 is one long cylinder with teeth cut into it and the idler gear 40 is larger so its axis is not on the same plane as the input and output components. Like the embodiments discussed above, the idler gear could be on a rail, but one on an angle to this plane, and the axis of a bearing block would still be parallel to the other gears. There would be two angular components with the shuttle and a track on the rail with a pin to insure precise alignment. Finally, the vector loading discussed above would also be applicable to the Persson configuration.

In still other embodiments, the present invention is used as a differential, which may be used to control a gear train. A differential is a device that works against itself and has an output that is a measure of efficiency; i.e. zero output is zero efficiency. The differential of the present invention combines the stack of gears and pinion gear of the present invention with a common prior art planetary system.

Figure 17:
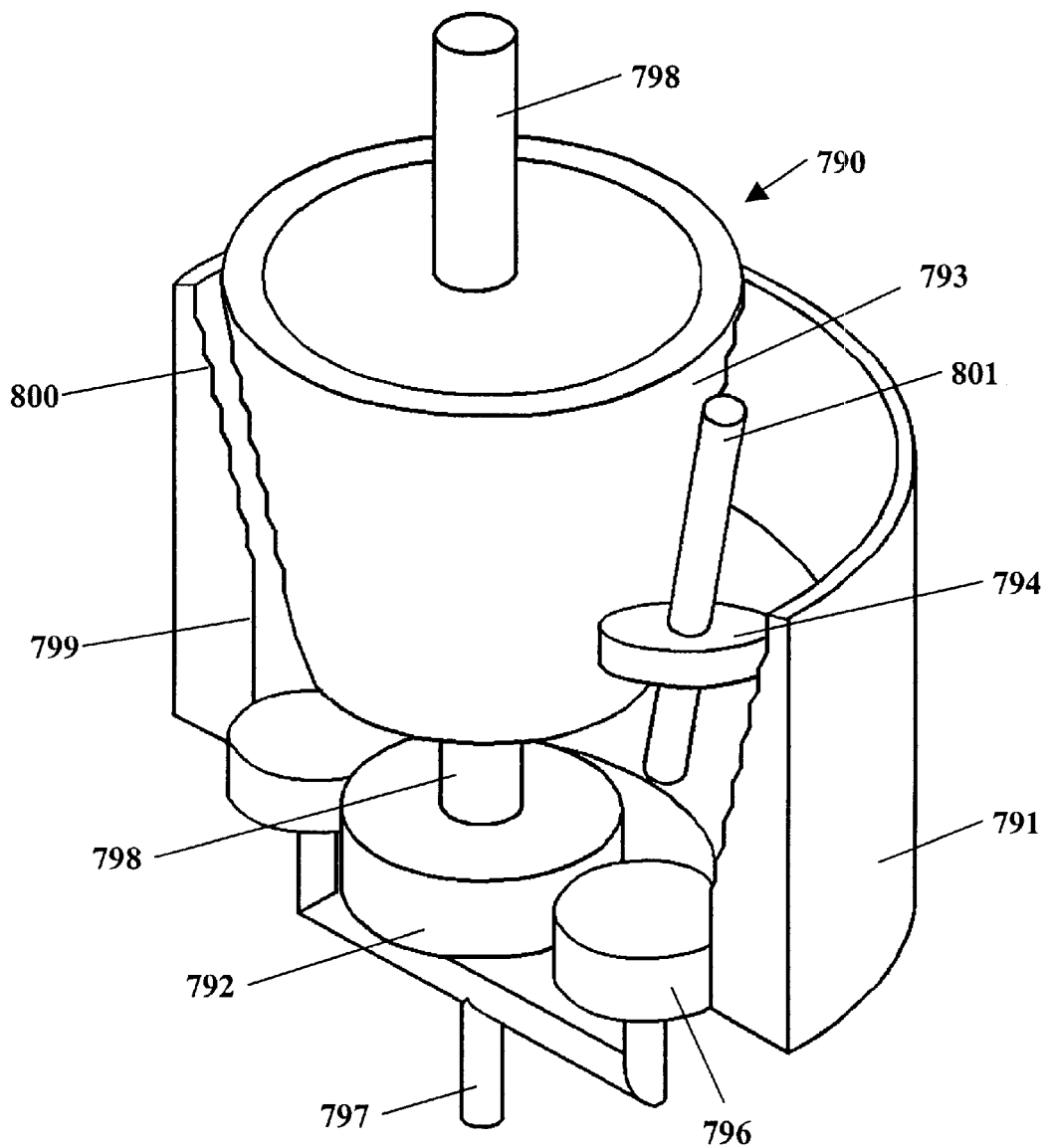
FIG. 17 is an isometric view of a differential utilizing a planetary system in accordance with the present invention.

As shown in the embodiment of FIG. 17, the differential 790 shares the ring gear 791. The ring gear 791 has an internal stepped portion 800 and a substantially cylindrical portion 799. At least one planet gear 796 is attached to a planet carrier 797 and is in contact with a sun gear 792 and an inside surface of the cylindrical portion 799 of the ring gear 791. A gear 794 is attached to an end of a shaft 801 and in contact with an inside surface of the stepped portion 800 of the ring. The sun gear 792 and stack of gears 793 are on the same shaft 798. The normal planetary system has a planet carrier 797 that includes an output shaft.

The system of the this embodiment of the invention controls the rotation of the ring gear 791 relative to the input shaft 798 of the stack of gears 793. If the stack of gears 793 is at a constant speed and shaft 801 is fixed, moving the gears 794 up and down the stack of gears 793 will change the speed of the ring stack of gears 791. The impact of changing the speed of the ring stack of gears 791 relative to the stack of gears 793 is on the normal planetary gears 796. They can be balanced so they do not orbit, so their orbit is in the same direction, or that their orbit is in a counter direction as the sun gear 792. Their orbits relative to the sun gear are translated into the rotation of the planet carrier and its output shaft.

Figure 18:
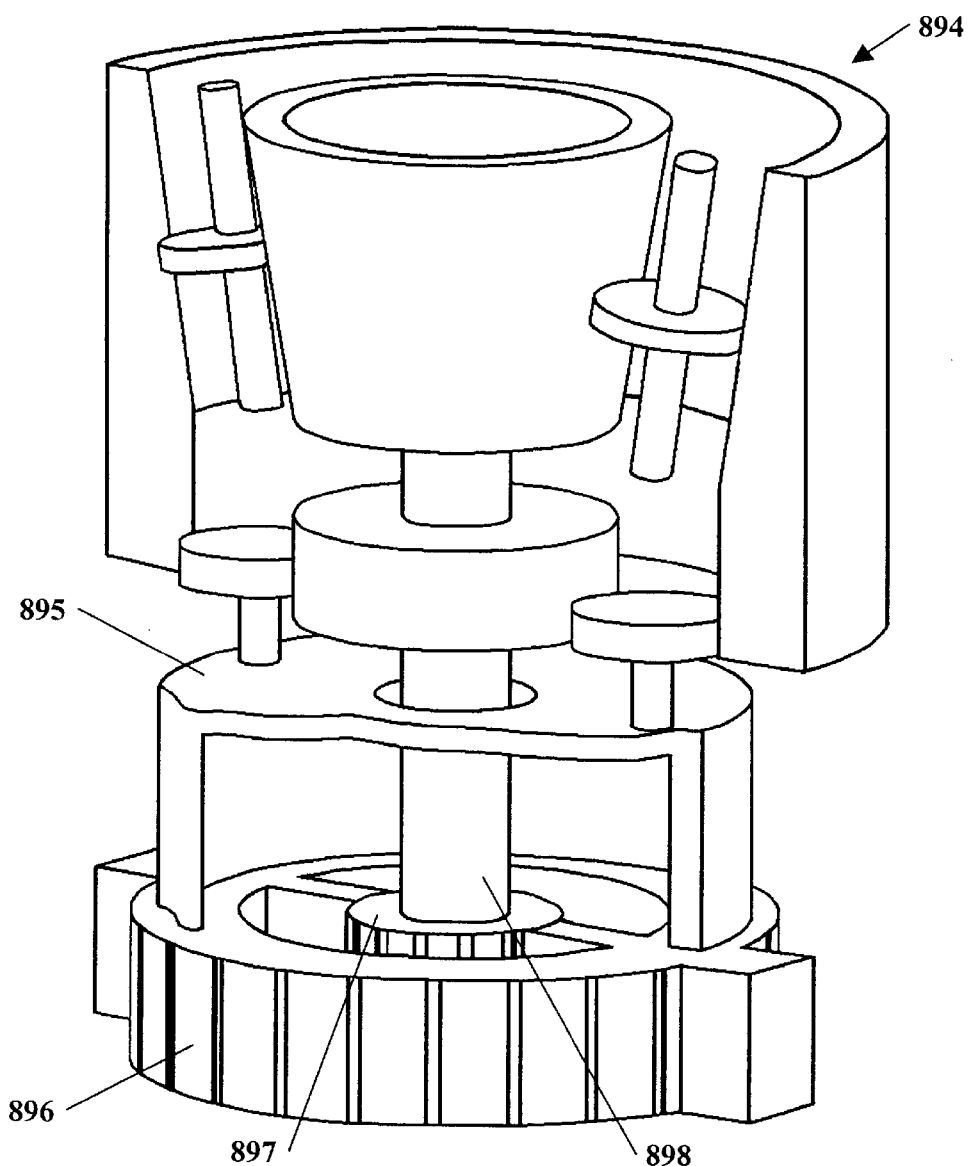
FIG. 18 is an isometric view of a differential system utilizing both an internal and an external commutator.

Referring now to FIG. 18, another embodiment of a differential 894 in accordance with the present invention is shown. In this embodiment, a planetary system of the present invention is coupled with second planetary system and utilized as a controlling device. Here, the differential 894 is designed to have the planet carrier 895 as the device output, allowing it to be at a stop, forward or backward relative to the device input 898.

In some embodiments, this differential 894 is utilized to control electric motors or generators, which have a commutator in contact with brushes that conduct the electricity to the armature coils. In such an embodiment, a second external commutator and brush system is added to create an internal 897 and external 896 commutator design in which the differential controls the external commutator and the internal commutator is the motor/generator's normal commutator and power input shaft 898 for the differential 894.

By arranging the differential 894 in this manner, a user is able to slow a generator input shaft from 1800 revolutions per minute to 1200 revolutions per minute and rotate the external commutator 600 revolutions per minute in the opposite direction to obtain 1800 revolutions per minute total on the commutator that controls the cycle output. Similarly there may be multiple commutator-brush configurations for specific speeds on the same external unit.

Figure 19:
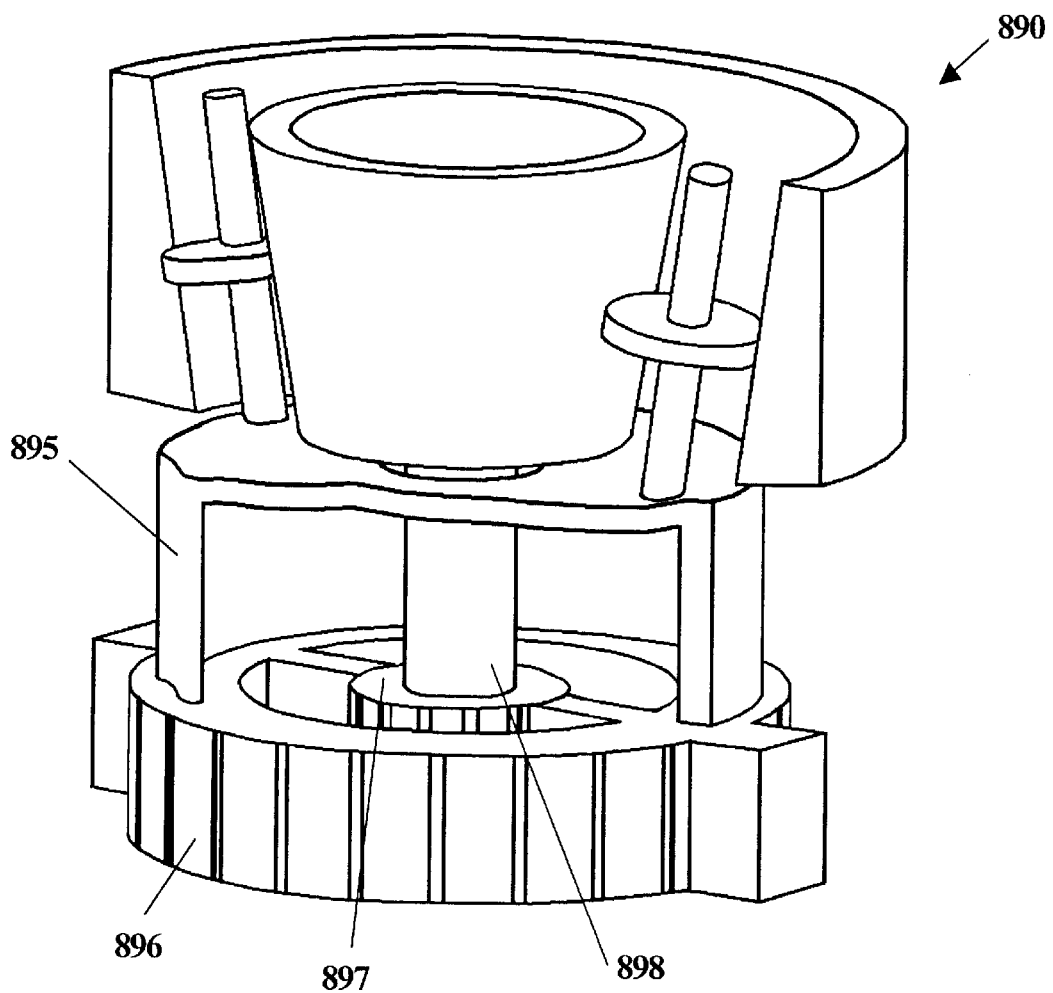
FIG. 19 shows a Tatham planetary system utilizing both an internal and an external commutator.

FIG. 19 shows a Tatham planetary system 890 using both an internal 897 and an external 896 commutator. The difference between the planetary system 890 and a differential system, such as the system described in FIG. 17, is that the differential controls efficiency whereas the planetary system 890 is a true transmission and works at the same level of efficiency. The planetary system 890 is always in motion at a specific relationship, while the differential system can have one component stopped, or at zero efficiency.

Yet another application for both the differential VCT and the differential VCT2 is on an orbital motor having a mechanical power source with one or more outputs that are controlled by a differential or planetary configuration. A differential configuration allows dead stop to forward output, and can even operate in reverse. The planetary configuration would always have forward output, but at different speeds relative to the sun. Accordingly a differential configuration would be used if a dead stop were needed, while the planetary configuration is used in all others as it has fewer parts than the differential configuration and is more efficient.

As noted above, a differential or planetary configuration can be configured with at least two inputs and one output. As shown in FIGS. 20A–20E, an orbital motor 210 has relative output to the multiple inputs 234, 241. The motor 210 is called an orbital motor because some components, which normally remain stationary, orbit. For an electric motor or generator, the coils 216 can orbit around the armature 218. However, it is understood that the same concept is readily adaptable to a gas turbine, in which the stator blades would orbit maintaining the compression relationships with the rotating turbines. It is also contemplated that a radial engine would be adapted for use with such a system.

The strength of this concept is the motor operates at its most efficient constant speed and the planetary 220 or differential 222 varies the output speed. Its constant speed is relative to the armature 218 and orbiting coils 216, while the actual speed of the armature 218 may vary with coils 216 varying relative to this so it stays constant. This relative variance is maintained by planetary 220 or differential 222 configurations of the VCT or VCT2.

Figure 20A:
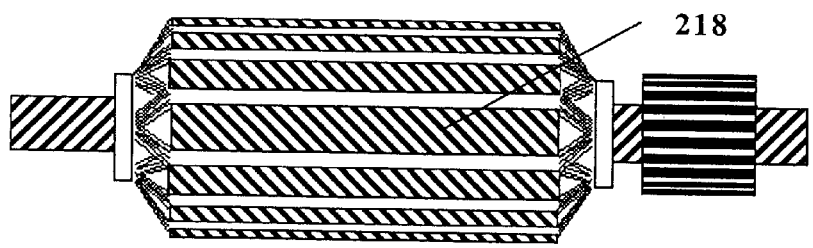
FIG. 20A is side view of an armature used with one embodiment of an orbital motor.
Figure 20B:
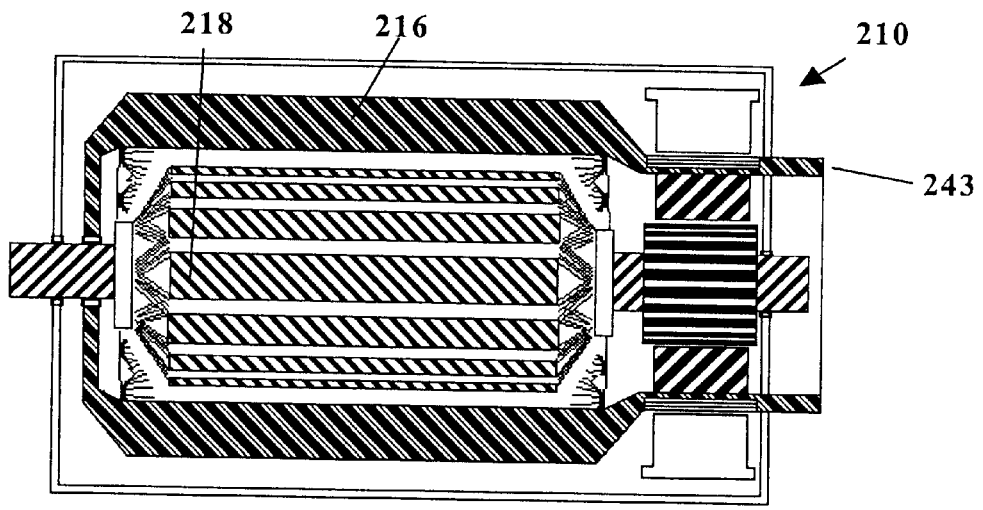
FIG. 20B is cut away side view of the armature of FIG. 20A with coils used as separate outputs.
Figure 20C:
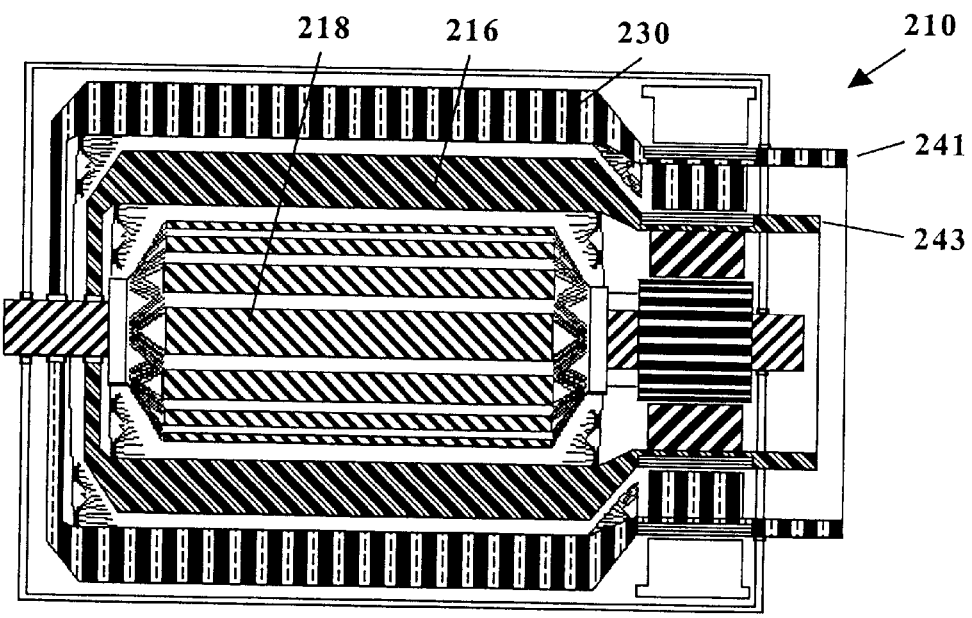
FIG. 20C is a cut away view of the armature of FIG. 20A and two coils serving as three outputs.
Figure 20D:
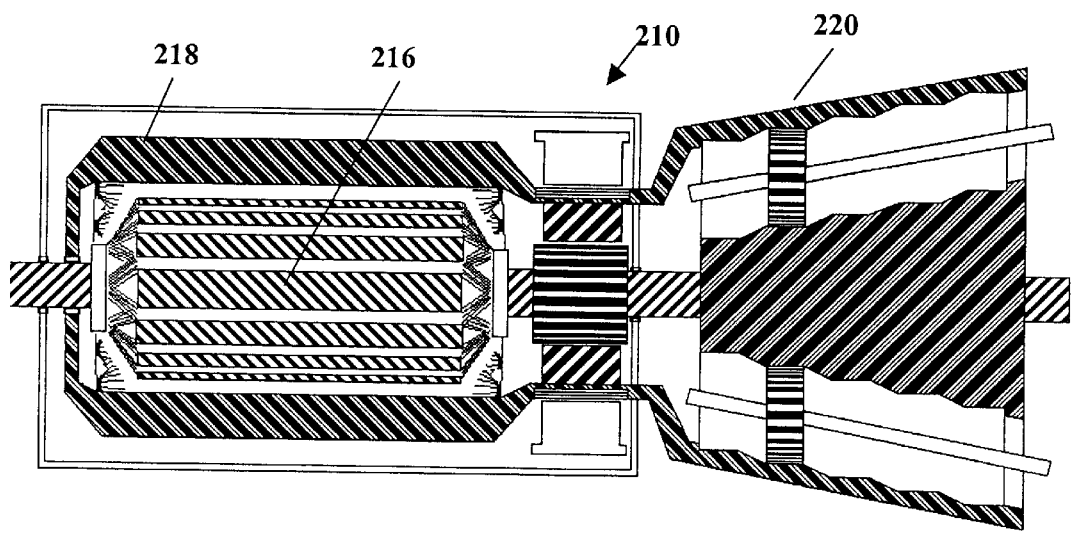
FIG. 20D is a cut away view of the armature and coils of FIG. 20B attached to a VCT2 planetary system.
Figure 20E:
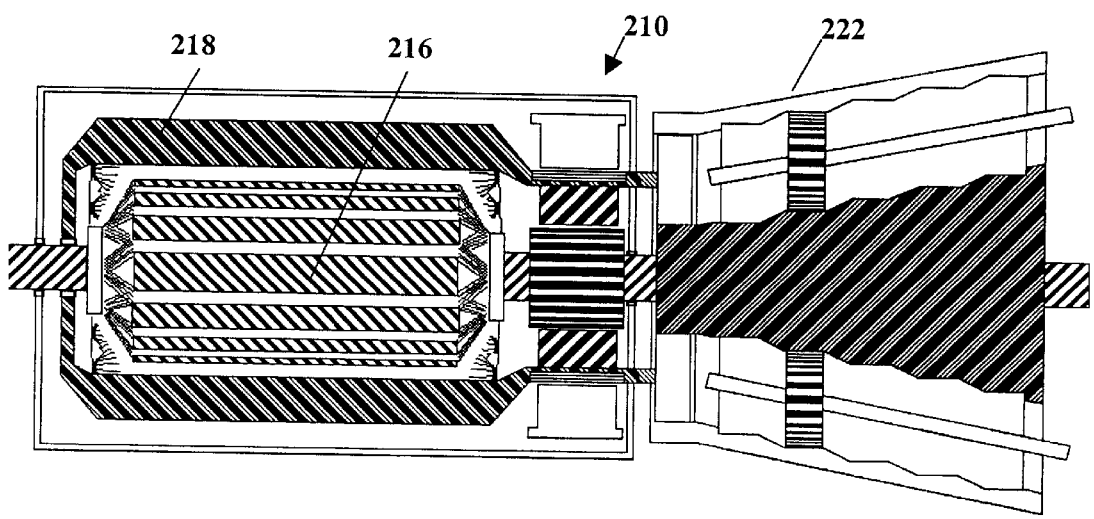
FIG. 20E is a cut away view of the armature and coils of FIG. 20B attached to a VCT2 differential system

In some embodiments, such as the embodiment of FIG. 20C, the orbital motor 210 has multiple orbital components, such as two or more coils 216, 230 along with an armature 218. The purpose of this is that the inner coil 216 can act as the armature to the outer coil 230. The actual armature 218 could be turned off and locked in position. The outer coil 230 could also have such a locking mechanism. This would create a motor that could function between two outputs ranges.

The orbital motor 210 could also be a generator with one varying input. An example is a diesel-electric generator that needs to run at a constant speed to maintain the electrical output cycles. Here the engine could run slower while the relationship between the armature and coils maintains a constant speed and output cycles. The impact is that the electrical demand could drop and the engine could slow down relative to that demand, but the output cycles would remain constant.

Another generating example is in a windmill with varying windspeeds. The transmission would be another component for managing electrical output cycles. In a hydroelectric dam, the dropping of the water level changes the pressure on the turbines. Currently blades are adjusted. Another option would be using the transmission for keeping the drop in torsion relative to the electrical output cycles.

Figure 21A:
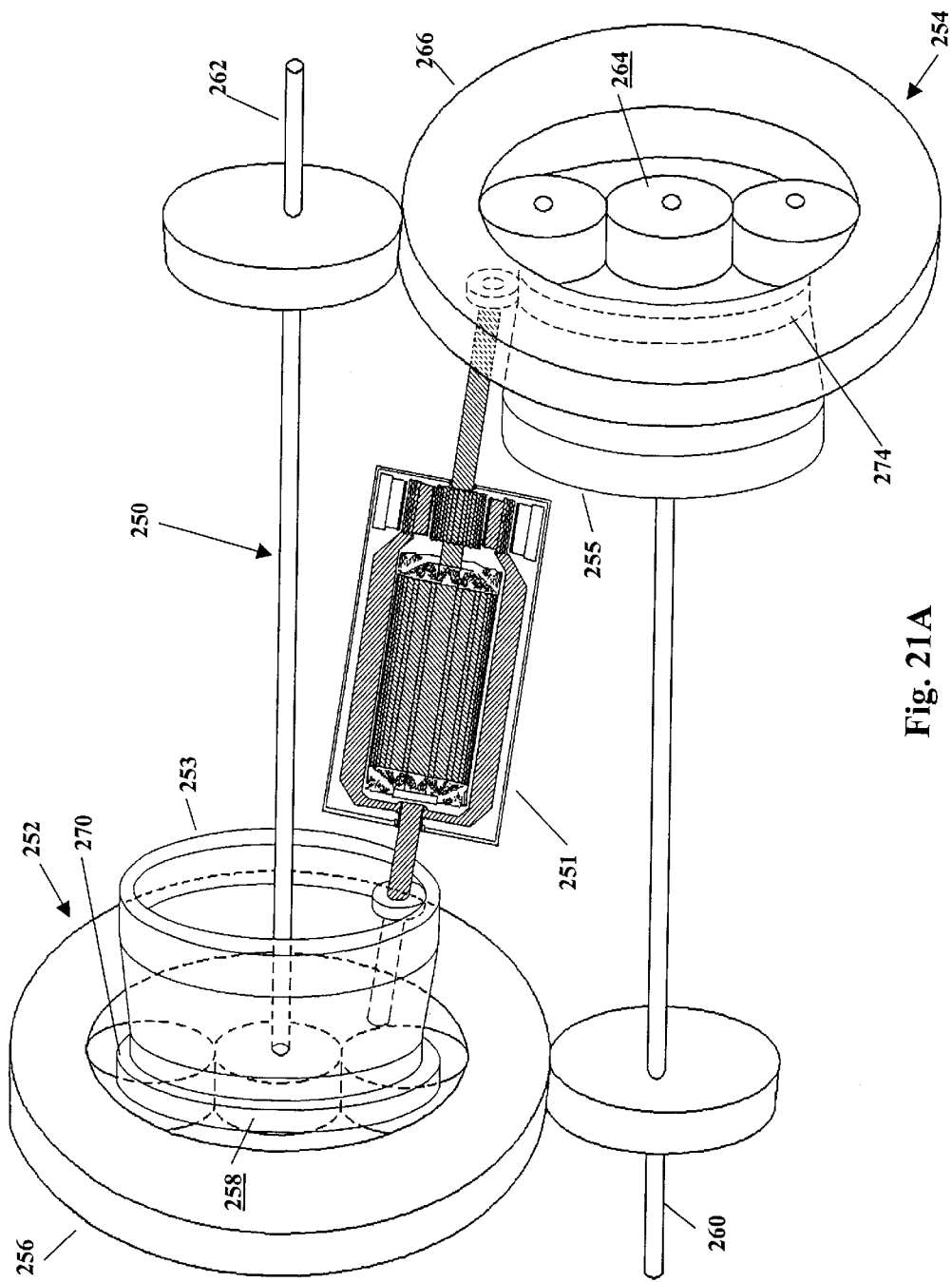
FIG. 21A is a side isometric view of a system utilizing an obital motor/generator for charging and discharging a mass storage device.
Figure 21B:
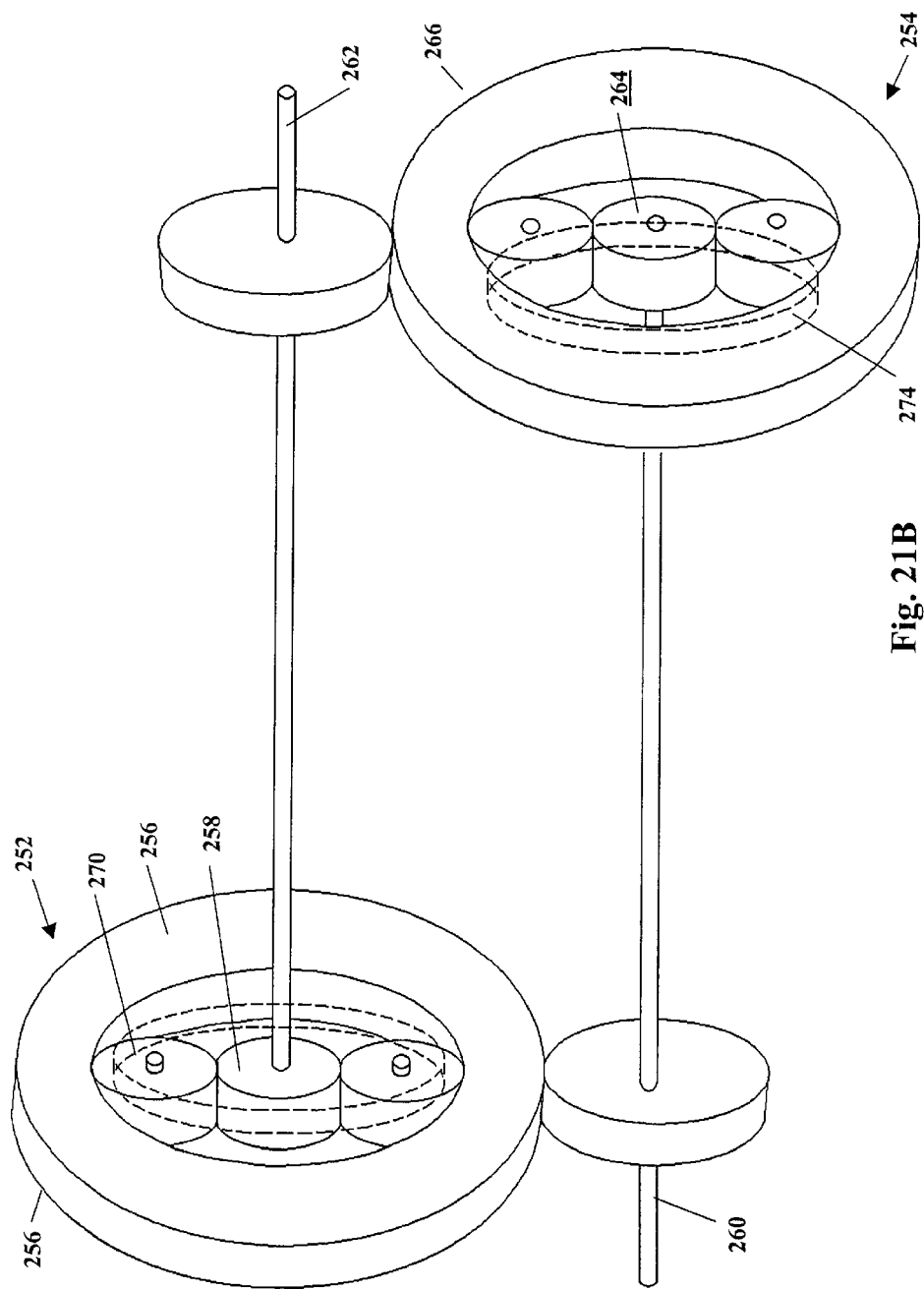
FIG. 21B is a cut away view of FIG. 21A showing the two planetary systems and their connections with the two mass storage devices.
Figure 21C:
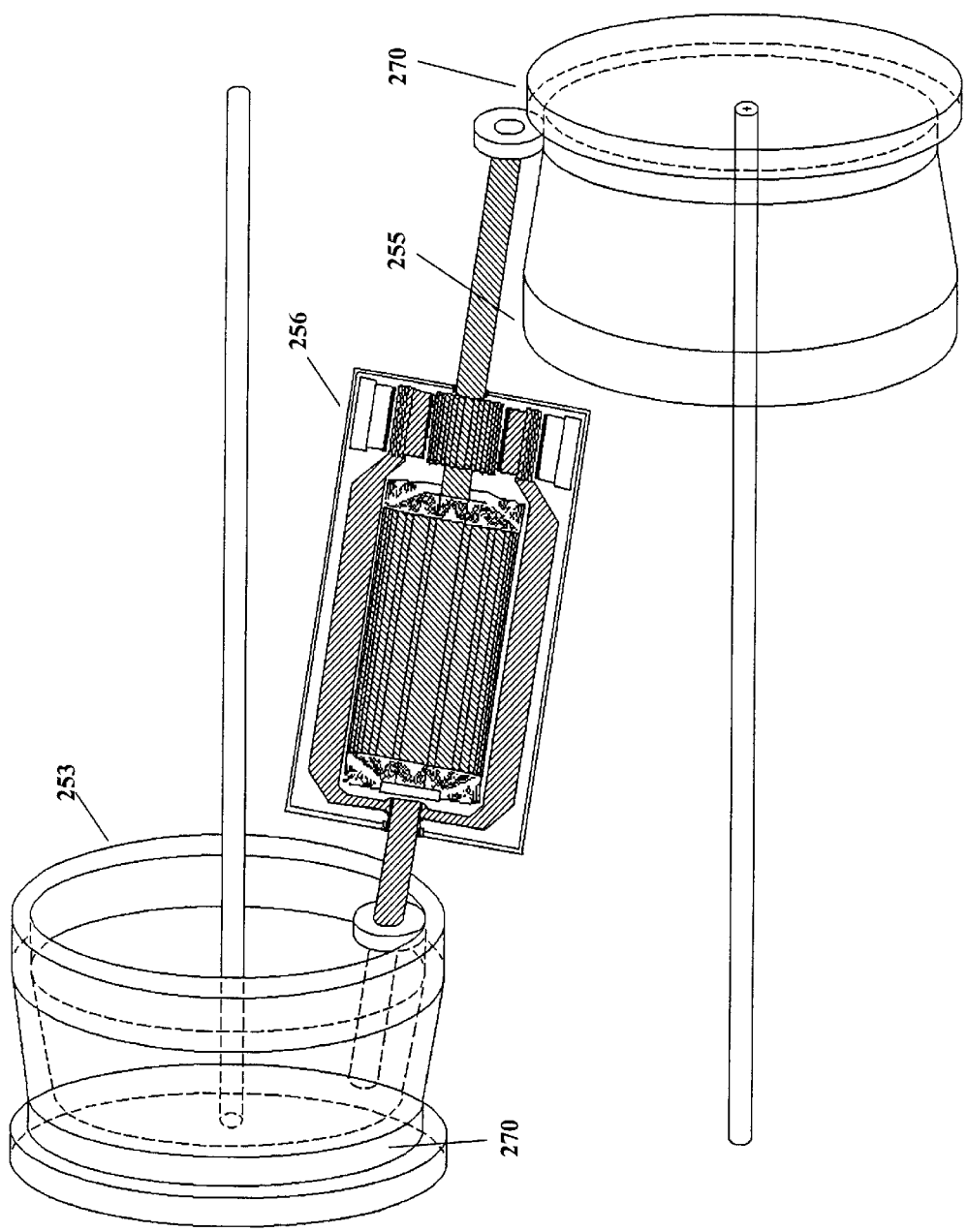
FIG. 21C is a cut away view of FIG. 21A showing only the VCT transmissions and orbital motor components.

Finally, as shown in FIGS. 21A–C, the VCT may be utilized in a Torque Amplifier 250 for controlling the charging and discharging of a Mass Storage Device (MSD). This is accomplished by creating and exploiting a difference between the speeds of two masses.

The Torque Amplifier 250 has two planetary systems 252, 254, connected to two VCT or VCT2 transmissions 253, 255, and an orbital motor/generator 251. A planetary system 252 has an input to the ring gear 256 from one MSD 260 and the sun gear 258 from the other MSD 262. The other planetary system 254 has the same configuration but opposite inputs.

The MSD's input is to opposed sun and ring gears. Input 262 is to sun gear 258 in planetary system 252 and the ring gear 266 in the system 254. Input 260 is to sun gear 264 in system 254 and the ring gear 256 in system 252.

The relationship between the two MSD 260, 262 is not locked: The planet carrier 270 rotates relative to differences in the speed of the MSD 260, 262, measured in revolutions per minute. The planet carrier 270 is attached to a VCT, with a shaft 272 connected to one input/output of an orbital motor/generator. The other planet carrier 274 provides the second input/output connection to the obital motor/generator.

With the two outputs of the orbital motor 256, the VCT is used to direct which MSD 260, 262 gets more energy by leveraging the output. The gear ratio on one carrier 270 greats less resistance then the gear ratio of the other carrier 274, so the torsion energy goes to that carrier 270.

Leverage causes the additional torsion from the carriers 270, 274 to be transmitted to the applied ring gear 256 and the MSD 260, 262 attached to it. This is not a differential configuration in that it does not work against itself. The energy is also applied to the sun gear 258 in the direction that amplifies its motion, but more will go to the ring gear 256. The energy is pushing both masses, just more is being applied to one then the other.

The planetary systems ensure a relative relationship. As one mass is being accelerated more than the other, the net planetary effect is that the relationship between the two carriers varies. When this exceeds specifications, the transmission has to change speeds in the opposite direction to direct more charge the other MSD.

This variance in speed is always going to happen, and is what makes this system work. As a practical energy storage device, the input/output frequency specifications have to be within 0.4% of 60 hertz. This is the standard for diesel/electric generators. The transmissions used may only be two speeds. These can be configured in a large variety of ways. It is important to note that the "charging" and "discharging" is indirect. The energy of the difference between the devices speeds is used, not a direct feed from the MSD. This means that an orbital motor can easily be kept to 1800 revolutions per minute, plus or minus 0.4% net, 900 revolutions per minute per side, even though the ring and sun of 252, 254 can be many times faster. Similarly, planetary systems can be designed for a large and small MSD. The small one is big enough to cycle the differences between the two.

Another unique application of the VCT and VCT2 transmissions is to control the power to counter revolving rotors of a helicopter. The transmission can direct more power to one rotor depriving it from the other. This would cause a change in the balance of rotational forces acting on the helicopter and it would turn in the direction counter to the weaker rotation.

Changing the amount of power being directed to multiple outputs would have unique applications in vehicles: In boats, the force from jet streams of water or multiple propellers could be manipulated by the transmission in a manor to enhance its steering. Tracked vehicles such as bulldozers, half tracks, or snow cats could be steered by applying more power to one side then the other positively, rather then a negative braking on the opposed side. In large vehicles like a dump truck, putting more power on one side would assist in steering. Instead of a differential slipping in a transaxle, the measured positive power applied more on one side would make the physics of steering easier.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:
1. A stack of gears comprising:
   a first gear having a first plurality of teeth and a first diameter;

a second gear disposed in parallel relation to, and sharing a common axis with, said first gear, said second gear having a second plurality of teeth and a second diameter; and at least one transition train comprising a third plurality of teeth disposed between said first gear and said second gear;

wherein said first plurality of teeth, said second plurality of teeth, and said third plurality of teeth are disposed in substantially perpendicular relation to said common axis; and wherein said transition train of teeth is dimensioned to form at least one deceleration channel and least one acceleration channel extending from each of said first gear and said second gear.

2. The stack of gears as claimed in claim 1 wherein said first plurality of teeth, said second plurality of teeth, and said third plurality of teeth are dimensioned to mate with a pinion gear having an axis that is substantially parallel to said common axis of said first gear and said second gear.

3. The stack of gears as claimed in claim 2 wherein a space between each of said third plurality of teeth of said transition train is substantially equal.

4. The stack of gears as claimed in claim 2 wherein at least one of said acceleration channel and said deceleration channel forms an S-curve between said first gear and said second gear.

5. The stack of gears as claimed in claim 2 further comprising at least a first conic surface and a second conic surface, wherein said first conic surface is disposed between said first gear and said transition train and wherein said second conic surface is disposed between said transition train and said second gear.

6. The stack of gears as claimed in claim 5 wherein said first conic surface and said second conic surface each have a conic angle dimensioned to mate with a bumper of the pinion gear.

7. The stack of gears as claimed in claim 2 wherein said third plurality of teeth each comprise teeth having a width of said first plurality of teeth and said second plurality of teeth.

8. The stack of gears as claimed in claim 2 wherein said first plurality of teeth, said second plurality of teeth, and said third plurality of teeth each comprise teeth chosen from a group consisting of straight teeth and helical teeth.

9. The stack of gears as claimed in claim 1 wherein said first plurality of teeth, said second plurality of teeth, and said third plurality of teeth are dimensioned to mate with a continuous loop drive.

10. The stack of gears as claimed in claim 9 wherein said first plurality of teeth, said second plurality of teeth, and said third plurality of teeth are dimensioned to mate with a continuous loop drive chosen from a group consisting of a chain, a toothed belt, a V-belt, and a flat belt drive.

11. The stack of gears as claimed in claim 9 wherein said third plurality of teeth are angled to accept a twisted continuous loop drive.

12. The stack of gears as claimed in claim 9 wherein at least one transition train comprises a first transition train having said third plurality of teeth disposed between said first gear and said second gear and a second transition train having a fourth plurality of teeth disposed between said first gear and said second gear, and wherein said third plurality of teeth crosses said fourth plurality of teeth at an intersection, and wherein said intersection comprises a surface having substantially no teeth.

13. A transmission system comprising:
a stack of gears comprising:

a first gear having a first plurality of teeth and a first diameter;

a second gear disposed in parallel relation to, and sharing a common axis with, said first gear, said second gear having a second plurality of teeth and a second diameter; and at least one transition train comprising a third plurality of teeth disposed between said first gear and said second gear;

wherein said first plurality of teeth, said second plurality of teeth, and said third plurality of teeth are disposed in substantially perpendicular relation to said common axis; and wherein said transition train of teeth is dimensioned to form at least one deceleration channel and least one acceleration channel extending from each of said first gear and said second gear; and a mating member dimensioned to mate with said first plurality of teeth, said second plurality of teeth, and said third plurality of teeth.

14. The transmission system as claimed in claim 13 wherein said mating member is a pinion gear having an axis that is substantially parallel to said common axis of said first gear and said second gear, and wherein said first plurality of teeth, said second plurality of teeth, and said third plurality of teeth are dimensioned to mate with said pinion gear.

15. The transmission system as claimed in claim 14 wherein a space between each of said third plurality of teeth of said transition train is substantially equal.

16. The transmission system as claimed in claim 14 wherein said third plurality of teeth of said transition train forms an S-curve between said first gear and said second gear.

17. The transmission system as claimed in claim 14 further comprising a control system for controlling a position of said pinion gear.

18. The transmission system as claimed in claim 17 wherein said control system comprises:

at least a first conic surface and a second conic surface disposed upon said stack of such that said first conic surface is disposed between said first gear and said transition train and wherein said second conic surface is disposed between said transition train and said second gear; and a pair of bumpers disposed at an angle upon said pinion gear;

wherein said first conic surface and said second conic surface each have a conic angle dimensioned to mate with said angle of said pair of bumpers disposed upon of said pinion gear.

19. The transmission system as claimed in claim 18 wherein said control system further comprises: a rail; and a rocker arm slidably attached to said rail;

wherein said pinion gear is rotatably attached to said rocker arm and said rail is disposed in relation to said stack of gears such that said pinion gear is in contact with one of said first plurality of teeth, said second plurality of teeth, and said third plurality of teeth.

20. The transmission system as claimed in claim 18 wherein said control system further comprises a resistance control for controlling a movement of said pinion gear.

21. The transmission system as claimed in claim 18 wherein said control system further comprises a rail into which a track is disposed; and a shuttle slidably attached to said rail, said shuttle having a bearing block and a pin that is dimensioned to fit within said track of said rail;

wherein said pinion gear is rotatably attached to said bearing block of said shuttle;

wherein said rail is disposed in relation to said stack of gears such that said pinion gear is in contact with one of said first plurality of teeth, said second plurality of teeth, and said third plurality of teeth; and wherein pin is disposed within said track of said rail such that said pin and said track are said resistance control.

22. The transmission system as claimed in claim 13 wherein said mating member is a continuous loop drive and wherein said first plurality of teeth, said second plurality of teeth, and said third plurality of teeth are dimensioned to mate with said continuous loop drive.

23. The transmission system as claimed in claim 22 wherein said continuous loop drive is chosen from a group consisting of a chain, a toothed belt, a V-belt, and a flat belt drive.

24. The transmission system as claimed in claim 22 wherein said third plurality of teeth are angled to accept a twisted continuous loop drive.

25. The transmission system as claimed in claim 22 wherein said at least one transition train comprises a first transition train having said third plurality of teeth disposed between said first gear and said second gear and a second transition train having a fourth plurality of teeth disposed between said first gear and said second gear, and wherein said third plurality of teeth crosses said fourth plurality of teeth at an intersection, and wherein said intersection comprises a surface having substantially no teeth.

26. The transmission system as claimed in claim 14 further comprising a second stack of gears and a second shaft upon which said second stack of gears is disposed, wherein said stack of gears is attached to a first shaft and wherein said pinion gear is disposed between, and in contact with, said stack of gears and said second stack of gears.

27. The transmission system as claimed in claim 26 wherein said pinion gear is disposed between, and in contact with, an outside surface of said stack of gears and an outside surface of said second stack of gears.

28. The transmission system as claimed in claim 26 wherein said gear is disposed between, and in contact with, an outside surface of said stack of gears and an inside surface of said second stack of gears.

29. The transmission system as claimed in claim 28 further comprising a second gear attached to a second gear shaft, wherein said second gear is disposed between, in contact with, an outside surface of said stack of gears and an inside surface of said second stack of gears.

30. The transmission system as claimed in claim 29 further comprising a planet carrier and wherein said shaft and said second shaft are attached to said planet carrier.

31. The transmission system as claimed in claim 30 wherein said gear and said second gear are helical gears.

32. The transmission system as claimed in claim 29 wherein said second stack of gears further comprises a cylindrical ring portion attached to, and extending from, one end of said second stack of gears, and wherein said system further comprises:

a sun gear fixedly attached to said cone shaft;

at least one planet gear in contact with said sun gear and an inside surface of said cylindrical ring portion of said second stack of gears; and a planet carrier rotatably attached to said at least one planet gear.

33. The transmission system as claimed in claim 32 further comprising an external commutator and an internal commutator, wherein said planet carrier is attached to said external commutator and said shaft is attached to said internal commutator.

34. The transmission system as claimed in claim 14 further comprising a substantially cylindrical output gear, said output gear having plurality of teeth dimensioned to engage a plurality of teeth of said pinion gear, wherein said pinion gear is rotatably disposed between said stack of gears and said output gear.

35. The transmission system as claimed in claim 14 further comprising:

at least one stationary component; and at least one orbital component dimensioned to rotate about said at least one stationary component; and wherein said at least one orbital component is rotatably attached to said stack of gears such that a rotation of said at least one orbital component is controlled by a rotation of said stack of gears.

36. The transmission system as claimed in claim 35 wherein said at least one orbital component comprises and inner coil and an outer coil, wherein said stationary component is an armature, and wherein said inner coil is adapted to serve both as a coil rotating about said armature, and as a second armature about which said outer coil rotates.

37. The transmission system as claimed in claim 35 wherein said stack of gears and said pinion gear are configured in a configuration selected from the group consisting of a planetary configuration and a differential configuration.

38. The transmission system as claimed in claim 14 further comprising:

a first mass and a second mass; and wherein said stack of gears and said pinion gear are configured to control a speed of said first mass and said second mass.

39. The transmission system as claimed in claim 38 further comprising a second stack of gears, and wherein said second stack of gears and said first stack of gears are configured as a first planetary system and a second planetary system.

* * * * *